United States Patent
Sugamata

(10) Patent No.: US 9,977,266 B2
(45) Date of Patent: May 22, 2018

(54) OPTICAL MODULATOR AND OPTICAL TRANSMISSION DEVICE USING OPTICAL MODULATOR

(71) Applicant: Sumitomo Osaka Cement Co., Ltd, Tokyo (JP)

(72) Inventor: Toru Sugamata, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/441,733

(22) Filed: Feb. 24, 2017

(65) Prior Publication Data

US 2017/0248804 A1 Aug. 31, 2017

(30) Foreign Application Priority Data

Feb. 29, 2016 (JP) .................. 2016-036962

(51) Int. Cl.
| | | |
|---|---|---|
| *G02F 1/035* | (2006.01) | |
| *G02F 1/01* | (2006.01) | |
| *G02F 1/03* | (2006.01) | |
| *G02F 1/225* | (2006.01) | |
| *G02F 1/21* | (2006.01) | |

(52) U.S. Cl.
CPC ............ *G02F 1/0123* (2013.01); *G02F 1/035* (2013.01); *G02F 1/0327* (2013.01); *G02F 1/2257* (2013.01); *G02F 2001/212* (2013.01); *G02F 2201/12* (2013.01); *G02F 2202/20* (2013.01)

(58) Field of Classification Search
CPC ...... G02F 1/0123; G02F 1/0327; G02F 1/035; G02F 1/2257; G02F 2001/212; G02F 2201/12; G02F 2202/20
See application file for complete search history.

(56) References Cited

U.S. PATENT DOCUMENTS

| | | | | |
|---|---|---|---|---|
| 4,929,042 A | * | 5/1990 | Hatori ..................... | G02F 1/335 385/7 |
| 5,805,743 A | * | 9/1998 | Iwamoto ................. | G02F 1/335 385/10 |
| 5,852,702 A | * | 12/1998 | Nishida ................... | G02F 1/335 385/10 |
| 7,239,764 B2 | | 7/2007 | Doi et al. | |
| 8,184,671 B2 | * | 5/2012 | Mori ...................... | B82Y 20/00 372/20 |
| 8,244,075 B2 | * | 8/2012 | Sugiyama ............... | G02F 1/035 385/2 |

(Continued)

FOREIGN PATENT DOCUMENTS

| | | |
|---|---|---|
| JP | 2003233042 A | 8/2003 |
| JP | 2010237497 A | 10/2010 |

(Continued)

*Primary Examiner* — Ellen Kim
(74) *Attorney, Agent, or Firm* — Taft Stettinius & Hollister LLP

(57) ABSTRACT

A substrate (102) having a piezoelectric effect, optical waveguide (138a, 140a, 138b, 140b, and the like) formed on the substrate, and a plurality of bias electrodes (152a, 152b, and the like) that control an optical wave (s) which propagate through the optical waveguides are provided, and the bias electrodes are constituted and/or disposed such that an electrical signal applied to one of the bias electrodes is prevented from being received by another one of the bias electrodes through a surface acoustic wave.

11 Claims, 22 Drawing Sheets

(56) References Cited

U.S. PATENT DOCUMENTS

| | | | | |
|---|---|---|---|---|
| 9,423,667 B2* | 8/2016 | Matsumoto | ............ | G02F 1/2255 |
| 2003/0219188 A1* | 11/2003 | Doi | ...................... | G02B 6/2813 |
| | | | | 385/3 |
| 2010/0150579 A1* | 6/2010 | Mori | ...................... | B82Y 20/00 |
| | | | | 398/200 |
| 2015/0277156 A1* | 10/2015 | Kondou | ................ | G02F 1/2255 |
| | | | | 385/2 |
| 2016/0054638 A1* | 2/2016 | Miyazaki | .............. | G02F 1/0123 |
| | | | | 385/2 |

FOREIGN PATENT DOCUMENTS

| | | | |
|---|---|---|---|
| JP | 2010-286770 | A1 | 12/2010 |
| JP | 2011-028014 | A1 | 2/2011 |
| JP | 2011-158652 | A1 | 8/2011 |
| JP | 2010-134115 | A1 | 6/2017 |

\* cited by examiner

US 9,977,266 B2

OPTICAL MODULATOR AND OPTICAL TRANSMISSION DEVICE USING OPTICAL MODULATOR

CROSS-REFERENCE TO RELATED APPLICATIONS

This application claims the benefit of Japanese Patent Application No. 2016-036962 filed Feb. 29, 2016, the disclosure of which is herein incorporated by reference in its entirety.

BACKGROUND OF THE INVENTION

Field of the Invention

The present invention relates to an optical modulator and an optical transmission device using the optical modulator and particularly to an optical modulator having a plurality of bias electrodes and an optical transmission device using the same optical modulator.

Description of Related Art

In high-frequency/high-capacity optical fiber communication systems, optical transmission devices equipped with a waveguide-type optical modulator are often used. Among them, optical modulators in which $LiNbO_3$ (hereinafter, also referred to as LN) having an electro-optic effect is used for the substrate allow a smaller amount of light loss and are capable of realizing optical modulation characteristics in a broader band than in modulators for which a semiconductor material such as indium phosphide (InP), silicon (Si), or gallium arsenide (GaAs) is used and thus are widely used in high-frequency/high-capacity optical fiber communication systems.

In the optical modulators in which LN is used, a Mach-Zehnder type optical waveguide, an RF electrode for applying high-frequency signals which are modulation signals to the optical waveguide, and a bias electrode for performing a variety of adjustments in order to maintain modulation characteristics favorable in the optical modulators are formed. Examples of the above-described bias electrode include a bias electrode for applying an electric field to optical waveguides in order to compensate for the fluctuation of bias points (a so-called temperature drift phenomenon) attributed to temperature changes and the like of the environment and a bias electrode for adjusting optical phases.

Meanwhile, regarding modulation methods in optical fiber communication systems, in response to the recent trend of transmission capacities being increased, multilevel modulation such as Quadrature Phase Shift Keying (QPSK) or Dual Polarization-Quadrature Phase Shift Keying (DP-QPSK) or transmission formats in which polarization multiplexing is incorporated into multilevel modulation have become mainstream.

Optical modulators performing QPSK modulation (QPSK modulators) or optical modulators performing DP-QPSK modulation (DP-QPSK modulators) include a plurality of nested Mach-Zehnder type optical waveguides and include a plurality of high-frequency signal electrodes and a plurality of bias electrodes (for example, refer to Japanese Laid-open Patent Publication No. 2010-237497), and thus there is a tendency that the size of devices increases, and there is a strong demand for, particularly, size reduction.

In the related art, as techniques for the above-described size reduction, methods in which the interaction between individual electrodes and optical waveguides is enhanced and thus the drive voltage can be reduced even in electrodes having a short length have been proposed. For example, constitutions in which a bias electrode is constituted as a comb electrode (or a blind-like electrode) that is constituted of an electrode for pushing and an electrode for pulling with respect to individual waveguides and voltages intended to be applied to bias electrodes (bias voltages) are reduced are known (for example, refer to Japanese Laid-open Patent Publication No. 2003-233042).

FIG. 21 is a view illustrating an example of the constitution of a DP-QPSK modulator of the related art. This DP-QPSK modulator 2100 is constituted of, for example, nested Mach-Zehnder type optical waveguides (heavy dotted lines in the drawing) formed on a Z-cut LN substrate 2102 and an electrode (the hatched portion in the drawing). In this optical modulator, light from a light source such as a laser diode (not illustrated) is incident on the right side in the drawing, and modulated light is emitted from the left side in the drawing. Emitted light rays are coupled using, for example, a space optical system and are incident on an optical fiber connected to a light transmission channel.

The optical waveguide is constituted of an incidence waveguide 2104 that receives incident light from the right side in the drawing, a light branching section 2106 that branches light propagating through the incidence waveguide, and two Mach-Zehnder type optical waveguides 2110a and 2110b that modulate individual light rays branched using the light branching section 2106.

A Mach-Zehnder type optical waveguide 2110a has an incidence waveguide 2112a, a light branching section 2114a that branches light propagating through the incidence waveguide, parallel waveguides 2116a and 2118a that propagate individual light rays branched using the light branching section 2114a, a Y-junction, Y-branch coupler 2120a that couples light rays propagating through the parallel waveguides 2116a and 2118a, and an emission waveguide 2122a that emits light rays coupled using the Y-junction, Y-branch coupler 2120a to the outside. In addition, the Mach-Zehnder type optical waveguide 2110a has Mach-Zehnder type optical waveguides 2130a (a portion inside the rectangle indicated by a dotted line in the drawing) and 2132a (a portion inside the rectangle indicated by a two-dot-dashed line in the drawing) that are respectively formed on part of the parallel waveguides 2116a and 2118a.

A bias electrode 2146a which is constituted of electrodes 2142a and 2144a and a bias electrode 2152a which is constituted of electrodes 2148a and 2150a are respectively formed on the light emission side (the left side in the drawing) of parallel waveguides 2134a and 2136a of the Mach-Zehnder type optical waveguide 2130a and on the light emission side (the left side in the drawing) of parallel waveguides 2138a and 2140a of the Mach-Zehnder type optical waveguide 2132a. In addition, a bias electrode 2158a which is constituted of electrodes 2154a and 2156a is formed on the light emission side (the left side in the drawing) of the parallel waveguides 2116a and 2118a of the Mach-Zehnder type optical waveguide 2110a.

The constitution of the Mach-Zehnder type optical waveguide 2110b is the same as the constitution of the Mach-Zehnder type optical waveguide 2110a as illustrated in the drawing. Therefore, the optical modulator 2100 includes six bias electrodes indicated by reference signs 2146a, 2152a, 2158a, 2146b, 2152b, and 2158b. In addition, in the optical modulator 2100, RF electrodes which are respectively constituted of electrodes 2170, 2172, 2174, 2176, 2178, 2180, 2182, 2184, and 2186 are also formed on eight parallel waveguides 2134a, 2136a, 2138a, 2140a, 2134b, 2136b, 2138b, and 2140b in the four Mach-Zehnder type optical waveguides 2130a, 2132a, 2130b, and 2132b.

Here, the bias electrodes 2146a, 2152a, 2146b, and 2152b are respectively bias electrodes for adjusting the bias point of the optical modulator constituted of the Mach-Zehnder type optical waveguides 2130a, 2132a, 2130b, and 2132b, and the bias electrodes 2158a and 2158b are respectively bias electrodes for adjusting the phases of light rays emitted from the emission waveguides 2122a and 2122b.

In addition, in the optical modulator 2100, the bias electrodes 2146a, 2152a, 2158a, 2146b, 2152b, and 2158b are constituted in a comb electrode form as illustrated in the drawing in order to reduce voltages intended to be applied to the respective bias electrodes in order to adjust the bias points or the phases.

Meanwhile, when an optical modulator is incorporated into an actually-used device and is used, it is necessary to accurately control the bias voltage so as to prevent the bias point from fluctuating in order to compensate for the above-described temperature drift and maintain light transmission characteristics in a favorable state. Therefore, to the bias electrodes for compensating for the temperature drift, low-frequency signals (dither signals) for detecting the fluctuation of the bias point and direct-current voltages (DC voltages) for compensating for the fluctuation and returning the bias point to a predetermined value are applied.

As the frequency of the dither signal, a frequency which is shorter than that of a high-frequency signal that is applied to the RF electrode and has no influence on the high-frequency signal is selected. In addition, in a case in which a plurality of bias electrodes are used, dither signals having a different frequency are used for the respective bias electrodes so as to facilitate determining which bias electrode a specific dither signal is applied to.

In this case, dither signals that are applied to the respective device electrodes are selected from a range of several kilohertz to several hundreds of megahertz in consideration of the factors of the dither signals not influencing RF signal frequencies (generally, several tens of gigahertz), frequencies not being close to each other, feedback control at a necessary velocity being possible, and the like.

SUMMARY OF THE INVENTION

Optical modulators of the related art which have the above-described constitution are, generally, capable of favorably compensating for temperature drift and the like and appropriately operating. However, in optical modulators in which a plurality of bias electrodes are used as described above (for example, DP-QPSK modulators), there is a possibility of the occurrence of a new problem regarding bias voltage control which is not observed in optical modulators including a single bias electrode. This problem is unique in optical modulators in which a plurality of bias electrodes are used, and the following phenomena are observed.

When a dither signal is applied to one bias electrode, there are cases in which optical characteristic control (phase adjustment or temperature drift compensation) in one or a plurality of other bias electrodes become unstable. In this case, there are cases in which the above-described unstable phenomenon is observed not only in other bias electrodes but also in the above-described bias electrode.

The above-described unstable phenomenon can also be caused not only between bias electrodes that are adjacent to each other or are close to each other but also between bias electrodes that are not adjacent to each other or are not close to each other.

There are cases in which the above-described unstable phenomenon is caused or not caused depending on the ambient temperature around the optical modulator.

There are cases in which the above-described unstable phenomenon is eliminated when the frequency of the dither signal is changed to a different frequency.

The above-described unstable phenomenon is not caused in a case in which only a DC voltage is applied to each of the bias electrodes.

The above-described unstable phenomenon is a phenomenon that cannot be explained using "electrical interference generated between close electrodes", and causes thereof have not yet been found for a long period of time.

Due to the above-described background, in optical modulators including a plurality of bias electrodes, there is a demand for solving the above-described unstable phenomenon of the bias control operation which is caused in a case in which dither signals are applied to the bias electrodes.

According to an aspect of the present invention, there is provided an optical modulator including: a substrate having a piezoelectric effect; an optical waveguide(s) formed on the substrate; and a plurality of bias electrodes that control an optical wave(s) which propagate through the optical waveguide(s), in which the bias electrodes are constituted and/or disposed such that an electrical signal applied to one of the bias electrodes is prevented from being received by another one of the bias electrodes through a surface acoustic wave.

According to the aspect of the present invention, at least one of the bias electrodes is constituted so that an electro-acoustic conversion efficiency of the at least one of the bias electrodes is suppressed so as to prevent an electrical signal applied thereto from being received by another one of the bias electrodes through the surface acoustic wave, the electro-acoustic conversion efficiency indicating an efficiency of converting an electrical signal applied to the bias electrode into a surface acoustic wave.

According to the aspect of the present invention, the at least one of the bias electrodes is constituted so that an interval of electrodes constituting the at least one of the bias electrodes changes stepwise along a longitudinal direction of the electrodes and thereby the at least one of the bias electrodes has a plurality of characteristic frequencies, each of which gives a maximum value of the electro-acoustic conversion efficiency.

According to the aspect of the present invention, the at least one of the bias electrodes is constituted so that an interval of electrodes constituting the at least one of the bias electrodes changes linearly or non-linearly along a longitudinal direction of the electrodes and thereby the at least one of the bias electrodes has characteristic frequencies distributed within a predetermined frequency range, the characteristic frequencies giving a maximum value of the electro-acoustic conversion efficiency.

According to the aspect of the present invention, each of at least two of the bias electrodes is constituted to have a different characteristic frequency from each other so as to prevent an electrical signal applied to one of the bias electrodes from being received by another one of the bias electrodes through the surface acoustic wave.

According to the aspect of the present invention, at least two of the bias electrodes are disposed such that one of the at least two of the bias electrodes is located at a predetermined position shifted along a longitudinal direction of electrodes constituting the at least two bias electrodes from a facing position where the one of the at least two of the bias electrodes faces another one of the at least two of the bias electrodes so as to prevent an electrical signal applied to one of the bias electrodes from being received by another one of the bias electrodes through the surface acoustic wave.

According to the aspect of the present invention, at least two of the bias electrodes are disposed so that a longitudinal direction of electrodes constituting one of the at least two of the bias electrodes and a longitudinal direction of electrodes constituting another one of the at least two of the bias electrodes form a predetermined angle so as to prevent an electrical signal applied to one of the bias electrodes from being received by another one of the bias electrodes through the surface acoustic wave.

According to the aspect of the present invention, the at least one of the bias electrodes is constituted such that a gap (s) between the electrodes constituting the at least one of the bias electrodes and/or an electrode width(s) of the electrodes constituting the at least one of the bias electrodes changes stepwise in order that the interval changes stepwise.

According to the aspect of the present invention, the at least one of the bias electrodes is constituted such that a gap(s) between the electrodes constituting the at least one of the bias electrodes and/or an electrode width(s) of the electrodes constituting the at least one of the bias electrodes changes linearly or non-linearly in order that the interval changes linearly or non-linearly.

According to the aspect of the present invention, electrodes constituting the bias electrode are constituted to form a straight line or a curved line along the optical waveguide(s) through which the optical wave is controlled using the bias electrode.

According to the aspect of the present invention, the bias electrode is a comb electrode.

According to another aspect of the present invention, there is provided an optical transmission device including: any one of the above-described optical modulators.

DETAILED DESCRIPTION OF THE INVENTION

The inventors of the present application studied in detail regarding the above-described unstable phenomenon of bias control operation in optical modulators including a plurality of bias electrodes and consequently found that surface acoustic waves (SAW) generated by the application of dither signals to the bias electrodes on an LN substrate are the cause of the unstable phenomenon. That is, when a dither signal is applied to one bias electrode (first bias electrode) formed on the LN substrate, surface acoustic waves (SAW) are generated on the substrate surface due to the piezoelectric effect of LN which is the substrate material, and the surface acoustic waves propagate through the substrate surface and reach another bias electrode (second bias electrode), and thus the second bias electrode receives the dither signal that has been applied to the first bias electrode, the received dither signal interferes bias control operation in the second bias electrode, and an adverse influence is generated.

This surface acoustic wave is an acoustic wave that propagates through the substrate surface and is reflected and scattered on the substrate surface and also acts on bias electrodes that are not close to but away from the first bias electrode, and the intensity or frequency of the surface acoustic wave changes due to changes in substrate properties (particularly, the propagation velocity of an acoustic wave on the substrate surface or the linear expansion of the substrate) that are caused by temperature changes. Therefore, the unstable phenomenon also occurs between bias electrodes that are not adjacent to each other or are not close to each other, and the unstable phenomenon is caused or not caused depending on the ambient temperature.

In addition, since a comb electrode is used as the bias electrode, the unstable phenomenon becomes significant when a dither signal having the same frequency as the characteristic frequency at which the electro-acoustic conversion efficiency indicating the efficiency of converting electrical signals applied to the comb electrode into surface acoustic waves (for example, the ratio of the power of a surface acoustic wave being generated to the power of the applied electrical signal) is maximized is applied to the bias electrode. In addition, this characteristic frequency is determined by the electrode interval in the comb electrode which is the bias electrode.

Figure 22:
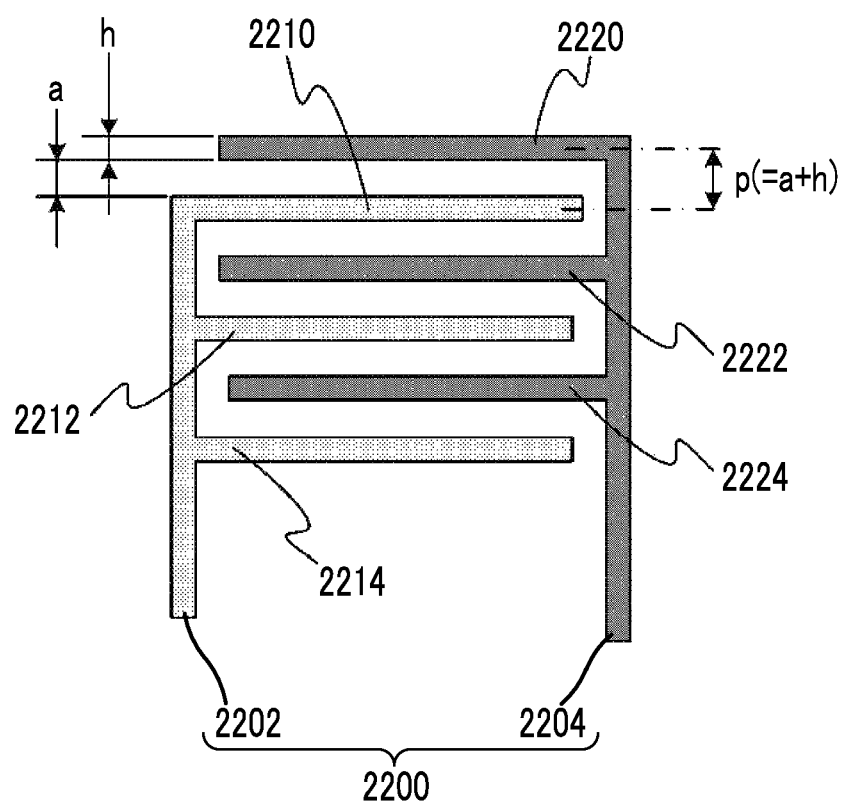
FIG. 22 is a view illustrating an example of the constitution of a comb electrode.

FIG. 22 is a view illustrating an example of the constitution of a comb electrode that can be used as a bias electrode in optical modulators. A comb electrode 2200 illustrated in the drawing is constituted of two electrodes 2202 and 2204. The electrodes 2202 and 2204 respectively have three electrodes 2210, 2212, 2214 and 2220, 2222, 2224 that extend parallel to each other in the horizontal direction in the drawing (hereinafter, electrode portions that are parallel to each other in a comb electrode such as the electrodes 2210, 2212, 2214 and 2220, 2222, 2224 will also be referred to as "electrodes constituting a comb electrode"). A total of six electrodes 2220, 2210, 2222, 2212, 2224, and 2214 have the same electrode width h and are separated from each other with a gap (electrode gap) a therebetween. Therefore, the electrode interval (pitch) p can be expressed by Expression (1) below.

$$p = a + h \quad (1)$$

At this time, the characteristic frequency $f_0$ (that is, a frequency at which the electro-acoustic conversion efficiency is maximized) of the comb electrode 2200 can be expressed by Expression (2) below.

$$f_0 = \frac{v}{\lambda} = \frac{v}{2p} = \frac{v}{2(a+h)} \quad (2)$$

Here, v represents the propagation velocity of a surface acoustic wave on the substrate surface, and λ represents the wavelength of a surface acoustic wave. In other words, a comb electrode having the electrode interval p has the characteristic frequency $f_0$ represented by Expression (2), and, when a voltage signal having the same frequency as the characteristic frequency $f_0$ is applied to the electrode, surface acoustic waves having the same frequency as the characteristic frequency $f_0$ are strongly excited. Conversely, when a surface acoustic wave having the same frequency as the characteristic frequency $f_0$ enters a comb electrode having the characteristic frequency $f_0$, an electrical signal having the same frequency as the characteristic frequency $f_0$ is strongly induced in the comb electrode. In bias electrodes having a comb electrode structure, the induced electrical signal turns into a strong noise signal and adversely influences bias control operation.

As is clear from Expression (2), the characteristic frequency $f_0$ can be changed by changing the electrode width h and/or the electrode gap a and thus changing the electrode interval p.

The value of the propagation velocity v of a surface acoustic wave varies depending on the kind of materials used for substrates, the direction of the substrate surface with respect to the molecular array (for example, crystal orientation) of the material, the propagation direction of the surface acoustic wave, and the like. For example, in a case in which a Y-cut LN substrate is used as the substrate, the propagation velocity reaches approximately 3,500 m/s for surface acoustic waves propagating in the Z direction, and, in a case in which a 128° Y-cut LN substrate is used as the substrate, the propagation velocity reaches approximately 4,000 m/s for surface acoustic waves propagating in the X direction.

The electrode width h and the electrode gap a are specified in consideration of the field patterns or field diameters (generally, approximately 10 µm) of an optical wave(s) propagating through optical waveguides.

For example, in a case in which the electrode interval is 15 µm, the electrode width is 20 µm, and the velocity of a surface acoustic wave is 3,500 m/s, the characteristic frequency $f_0$ reaches approximately 50 MHz. In this case, when a dither signal having a frequency component that is close to 50 MHz is applied to a bias electrode (first bias electrode) constituted of the comb electrode 2200 illustrated in the drawing, a strong surface acoustic wave is excited. This surface acoustic wave propagates through the substrate surface in a direction perpendicular to the longitudinal direction of electrodes constituting the comb electrode 2200 (for example, the electrode 2220) (the vertical direction in the drawing) and reaches another bias electrode (second bias electrode, comb electrode). In the second bias electrode, the surface acoustic wave is converted to an electrical signal due to a piezoelectric effect, a noise signal having the above-described frequency is generated, and bias control operation is influenced.

The degree of the influence on the second bias electrode becomes strongest in a case in which the second bias electrode is disposed at a position at which the surface acoustic wave arrives in a direction perpendicular to the longitudinal direction of electrodes constituting the second bias electrode and has the same characteristic frequency as the frequency of the surface acoustic wave. In addition, the degree of the influence also depends on the value of the electro-acoustic conversion efficiency at the characteristic frequency of the second device and increases as the efficiency increases.

The present invention has been made on the basis of the above-described finding, and, in a case in which there are a plurality of bias electrodes that control an optical wave(s) propagating through at least one optical waveguide formed on a substrate having a piezoelectric effect such as LN, the bias electrodes are constituted and/or disposed such that an electrical signal applied to the bias electrode is prevented from being received by other bias electrodes through a surface acoustic wave.

That is, bias electrodes are constituted and/or disposed so that the generation intensities of surface acoustic waves that are generated from the bias electrodes are reduced and/or bonding (interaction) between the bias electrodes through surface acoustic waves is reduced, whereby the occurrence of the above-described unstable phenomenon through the surface acoustic waves (hereinafter, also referred to as "interference between the bias electrodes") is suppressed. More specifically, bias electrodes are constituted and/or disposed as described below.

A: The uniformity and/or periodicity of electrode intervals between electrodes constituting bias electrodes (comb electrodes) are disarrayed, and the electro-acoustic conversion efficiency of the bias electrodes as a whole is suppressed, whereby the generation intensities of surface acoustic waves are reduced. More specifically, A-1: a plurality of electrode intervals are provided in at least one bias electrode so that the bias electrode has a plurality of characteristic frequencies, and the periodicity of electrode disposition in the bias electrode is disarrayed, whereby the generation intensities of surface acoustic waves around one characteristic frequency are reduced, and/or A-2: at least one of the bias electrodes is constituted such that an interval of electrodes constituting the at least one of the bias electrodes changes stepwise along the longitudinal direction of the electrodes and thereby the at least one of the bias electrodes has a plurality of characteristic frequencies, and the uniformity of electrode shapes in the bias electrode is disarrayed, whereby the generation intensities of surface acoustic waves around one characteristic frequency are reduced, and/or A-3: at least one of the bias electrodes is constituted so that an interval between electrodes constituting the bias electrode changes (for example, increase and/or decrease) linearly or non-linearly along the longitudinal direction of the electrodes so that the bias electrode has characteristic frequencies distributed in a predetermined frequency range, and the uniformity of electrode shapes in the bias electrode is disarrayed, whereby the generation intensities of surface acoustic waves around one characteristic frequency are reduced.

B: Each of at least two bias electrodes is constituted to have a different characteristic frequency from each other so as to prevent a surface acoustic wave generated in one bias electrode from being converted to an electrical signal in the other bias electrode, and/or C: at least two bias electrodes are disposed such that an electrical signal applied to one bias electrode is prevented from being received by the other bias electrodes through a surface acoustic wave. More specifically, C-1: for at least two bias electrodes, one of the two bias electrodes is located at a predetermined position shifted along the longitudinal direction of electrodes constituting the two bias electrodes from a facing position where the two bias electrodes face each other and/or C-2: at least two bias electrodes are disposed so that the longitudinal direction of electrodes constituting one bias electrode and the longitudinal direction of electrodes constituting the other bias electrode form a predetermined angle.

Due to the above-described constitutions, even in a case in which dither signals having different frequencies are respectively applied to a plurality of bias electrodes, it is possible to realize stable bias control operation that does not depend on the selected frequencies of dither signals or the ambient temperature. In addition, when an optical modulator including bias electrodes having the above-described constitution is used, it is possible to realize optical transmission devices capable of robust high-frequency and high-capacity optical communication by performing stable optical modulation operation that does not depend on the selected frequencies of dither signals or the ambient temperature.

Hereinafter, embodiments of the present invention will be described with reference to the accompanying drawings. Meanwhile, optical modulators described in the present embodiments are, for example, DP-QPSK modulators, but the present invention is not limited thereto and can be used to produce a variety of types of optical modulators including a plurality of bias electrodes.

<First Embodiment>

Figure 1:
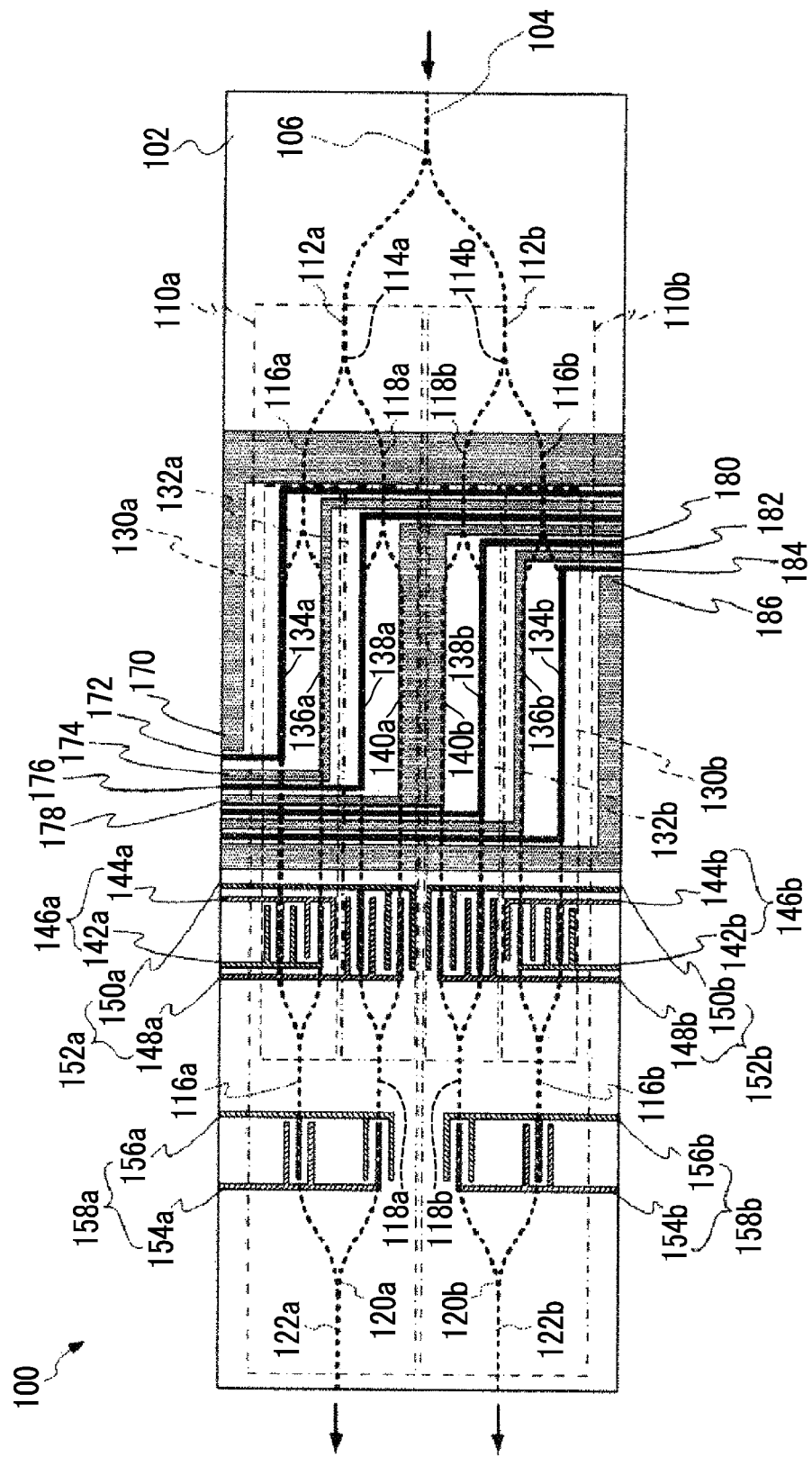
FIG. 1 is a view illustrating the constitution of an optical modulator according to a first embodiment of the present invention.
Figure 21:
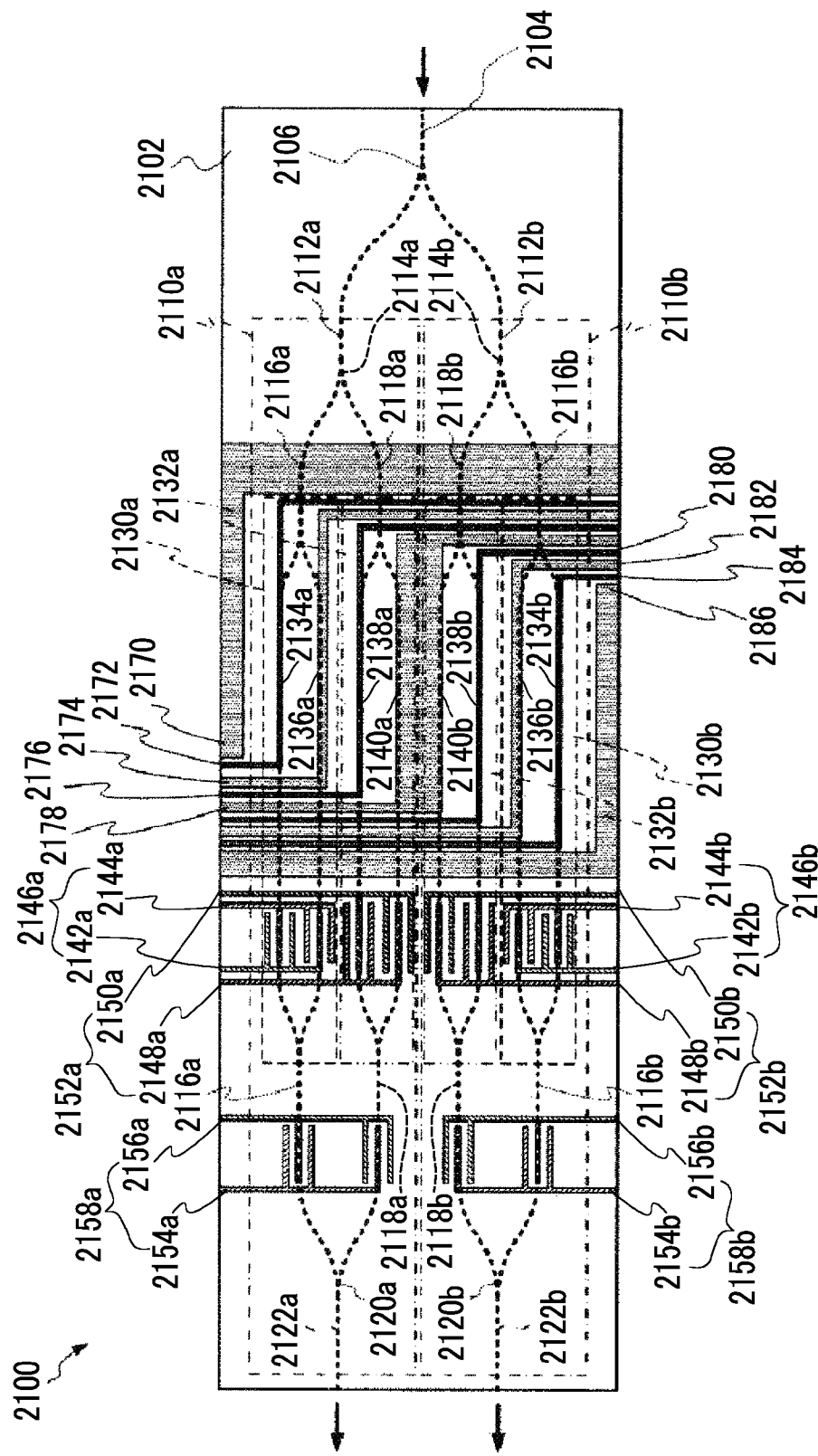
FIG. 21 is a view illustrating the constitution of an optical modulator of the related art.

First, a first embodiment of the present invention will be described. FIG. 1 is a view illustrating the constitution of an optical modulator according to the first embodiment of the present invention. As described above, an optical modulator 100 according to the present embodiment is, for example, a DP-QPSK modulator, and the basic constitution thereof is the same as that of a DP-QPSK modulator of the related art which is illustrated in FIG. 21. That is, the present optical modulator 100 is constituted of, for example, nested Mach-Zehnder type optical waveguides (the heavy dotted lines in the drawing) formed on a Z-cut LN substrate 102 and electrodes (hatched portions in the drawing). In this optical modulator, light from a light source (not illustrated) such as a laser diode is incident from the right side in the drawing, and modulated light is emitted from the left side in the drawing. Emitted light rays are coupled using, for example, a space optical system and are incident on an optical fiber connected to a light transmission channel.

The optical waveguide is constituted of an incidence waveguide 104 that receives incident light from the right side in the drawing, a light branching section 106 that branches light propagating through the incidence waveguide, and two Mach-Zehnder type optical waveguides 110a and 110b that modulate individual light rays branched using the light branching section 106.

A Mach-Zehnder type optical waveguide 110a has an incidence waveguide 112a, a light branching section 114a that branches light propagating through the incidence waveguide, parallel waveguides 116a and 118a that propagate individual light rays branched using the light branching section 114a, a Y-junction, Y-branch coupler 120a that couples light rays propagating through the parallel waveguides 116a and 118a, and an emission waveguide 122a that emits light rays coupled using the Y-junction, Y-branch coupler 120a to the outside. In addition, the Mach-Zehnder type optical modulator 110a has Mach-Zehnder type optical waveguides 130a (a portion inside the rectangle indicated by a dotted line in the drawing) and 132a (a portion inside the rectangle indicated by a two-dot-dashed line in the drawing) that are respectively formed on part of the parallel waveguides 116a and 118a.

A bias electrode 146a which is constituted of electrodes 142a and 144a and a bias electrode 152a which is constituted of electrodes 148a and 150a are respectively formed on the light emission side (the left side in the drawing) of parallel waveguides 134a and 136a of the Mach-Zehnder type optical waveguide 130a and on the light emission side (the left side in the drawing) of parallel waveguides 138a and 140a of the Mach-Zehnder type optical waveguide 132a. In addition, a bias electrode 158a which is constituted of electrodes 154a and 156a is formed on the light emission side (the left side in the drawing) of the parallel waveguides 116a and 118a of the Mach-Zehnder type optical waveguide 110a.

The constitution of the Mach-Zehnder type optical waveguide 110b is the same as the constitution of the Mach-Zehnder type optical waveguide 110a as illustrated in the drawing. In addition, in the optical modulator 100, RF electrodes which are respectively constituted of electrodes 170, 172, 174, 176, 178, 180, 182, 184, and 186 are also formed on eight parallel waveguides 134a, 136a, 138a, 140a, 134b, 136b, 138b, and 140b in the four Mach-Zehnder type optical waveguides 130a, 132a, 130b, and 132b.

Here, the bias electrodes 146a, 152a, 146b, and 152b are respectively bias electrodes for adjusting the bias point of the optical modulator constituted of the Mach-Zehnder type optical waveguides 130a, 132a, 130b, and 132b, and the bias electrodes 158a and 158b are respectively bias electrodes for adjusting the phases of light rays emitted from the emission waveguides 122a and 122b.

Figure 2:
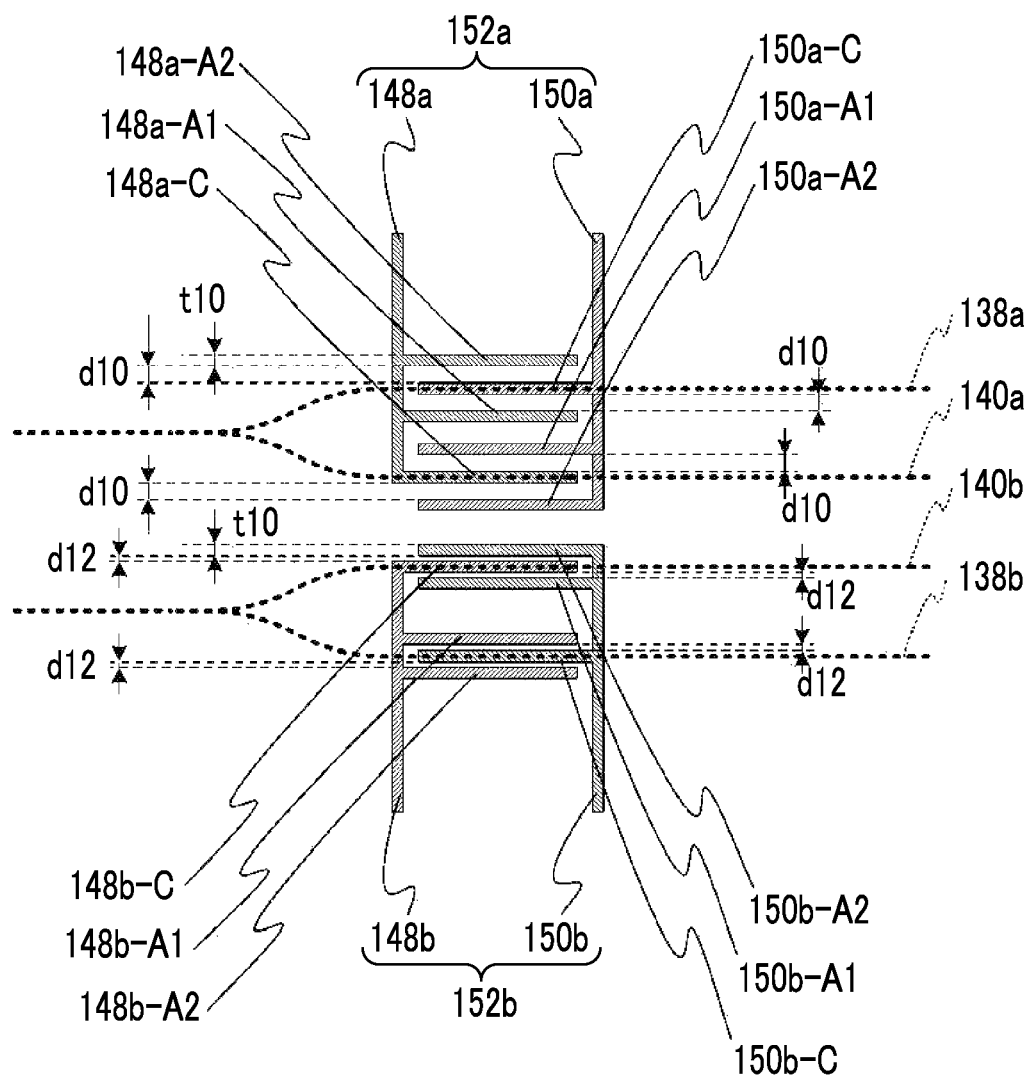
FIG. 2 is a partial detail view of a vicinity of a bias electrode in the optical modulator illustrated in FIG. 1.

FIG. 2 is a partial detail view of the bias electrodes 152a and 152b and vicinities thereof in the optical modulator 100 illustrated in FIG. 1.

The bias electrode 152a is a bias electrode having a push-pull constitution and has a central electrode 150a-C which extends from an electrode 150a and is formed on an optical waveguide 138a and a central electrode 148a-C which extends from an electrode 148a and is formed on an optical waveguide 140a. In addition, the bias electrode 152a has adjacent electrodes 148a-A1 and 148a-A2 which sandwich the central electrode 150a-C in the vertical direction in the drawing, run parallel to each other, and extend from the electrode 148a and adjacent electrodes 150a-A1 and 150a-A2 which sandwich the central electrode 148a-C in the vertical direction in the drawing, run parallel to each other, and extend from the electrode 150a (that is, the central electrodes 150a-C and 148a-C and the adjacent electrodes 148a-A1, 148a-A2, 150a-A1, and 150a-A2 are electrodes constituting a comb electrode which is the bias electrode 152a).

Therefore, when a voltage is applied between the electrodes 148a and 150a, electric fields are applied in mutually opposite direction to the optical waveguides 138a and 140a in a direction perpendicular to the paper illustrating FIG. 2 (so-called push-pull operation), and the refractive indexes of the optical waveguides 138a and 140a change in mutually opposite directions (that is, when one refractive index increases, the other refractive index decreases).

Here, the electrode widths (the distances in a direction perpendicular to the longitudinal directions of the respective electrodes) of the electrodes 148a-C, 148a-A1, 148a-A2, 150a-C, 150a-A1, and 150a-A2 are all the same width t10, and the electrode gap between the central electrode 150a-C and the adjacent electrode 148a-A1 or 148a-A2 and the electrode gap between the central electrode 148a-C and the adjacent electrode 150a-A1 or 150a-A2 are both d10. Therefore, the electrode interval p10 in the bias electrode 152a is $$p10 = t10 + d10 \quad (3),$$

and the bias electrode 152a has a characteristic frequency $f_0$-10 which is determined by the electrode interval p10.

The constitution of the bias electrode 152b is, similar to the bias electrode 152a, a push-pull constitution and has a central electrode 150b-C which extends from the electrode 150b and is formed on the optical waveguide 138b and a central electrode 148b-C which extends from the electrode 148b and is formed on the optical waveguide 140b. In addition, the bias electrode 152b has adjacent electrodes 148b-A1 and 148b-A2 which sandwich the central electrode 150b-C in the vertical direction in the drawing, run parallel to each other, and extend from the electrode 148b and adjacent electrodes 150b-A1 and 150b-A2 which sandwich the central electrode 148b-C in the vertical direction in the drawing, run parallel to each other, and extend from the electrode 150b (that is, the central electrodes 150b-C and 148b-C and the adjacent electrodes 148b-A1, 148b-A2, 150b-A1, and 150b-A2 are electrodes constituting a comb electrode which is the bias electrode 152b).

Here, the electrode widths (the distances in a direction perpendicular to the longitudinal directions of the respective electrodes) of the electrodes 148b-C, 148b-A1, 148b-A2, 150b-C, 150b-A1, and 150b-A2 are all the width t10 which is the same as those of the central electrode 150a-C and the like in the bias electrode 152a, and the electrode gap between the central electrode 150b-C and the adjacent electrode 148b-A1 or 148b-A2 and the electrode gap between the central electrode 148b-C and the adjacent electrode 150b-A1 or 150b-A2 are both d12 having a different size (distance) from the electrode gap d10 in the bias electrode 152a. Therefore, the electrode interval p12 in the bias electrode 152b is $$p12 = t10 + d12 \quad (4),$$

and the bias electrode 152b has a characteristic frequency $f_0$-12 which is determined by the electrode interval p12.

As described above, since the electrode gap d10 in the bias electrode 152a and the electrode gap d12 in the bias electrode 152b are different from each other, the electrode interval p10 and the electrode interval p12 become different from each other. Therefore, the characteristic frequency $f_0$-10 of the bias electrode 152a and the characteristic frequency $f_0$-12 of the bias electrode 152b become different values.

As a result, even when a surface acoustic wave which is strongly generated in one bias electrode 152a (or 152b) and has the same frequency as the characteristic frequency $f_0$-10 (or $f_0$-12) reaches the other bias electrode 152b (or 152a) having the characteristic frequency $f_0$-12 (or $f_0$-10) which is different from the characteristic frequency $f_0$-10 (or $f_0$-12), no large electrical signal (therefore, large electrical noise) is generated in the bias electrode 152b (or 152a). That is, in the present embodiment, the two bias electrodes 152a and 152b are constituted so as to have mutually different characteristic frequencies $f_0$-10 and $f_0$-12 such that an electrical signal applied to one bias electrode 152a (or 152b) is prevented from being received by the other bias electrode 152b (or 152a) through the surface acoustic wave, whereby interference between the bias electrodes 152a and 152b through surface acoustic waves is prevented.

Here, the values of the gaps d10 and d12 have an influence on the intensity of a bias voltage to be applied to the bias electrodes 152a and 152b. That is, as the values of the gaps d10 and d20 increase, electric fields which can be generated between the optical waveguides 138a and 140a and between the optical waveguides 138b and 140b due to the respective bias electrodes 152a and 152b become weaker, and thus the bias voltage to be applied to the bias electrodes 152a and 152b increases. Therefore, it is necessary to set the value of the gaps d10 and d12 in a permitted range of the bias voltage.

For example, when the gaps d10 and d12 are set to 15 μm and 16 μm (different from each other by approximately 7%), the difference between bias voltages which become necessary for the bias electrodes 152a and 152b becomes approximately 1% and can be almost ignored.

In the present embodiment, the bias electrodes 152a and 152b have different characteristic frequencies, but the constitution is not limited thereto, and, even when, for example, at least two arbitrary bias electrodes (for example, two bias electrodes most adjacent to each other, two bias electrodes to which the greatest bias voltage is applied, or the like) out of a plurality of the bias electrodes 146a, 152a, 158a, 146b, 152b, and 158b in the optical modulator 100 are constituted so as to have mutually different characteristic frequencies like the above-described bias electrodes 152a and 152b, the same effect can be obtained.

Furthermore, interference between bias electrodes can be prevented not only by providing different characteristic frequencies to two bias electrodes as in the present embodiment but also by using a variety of constitutions.

Hereinafter, modification examples of the present embodiment will be described using FIGS. 3 to 13. Two bias electrodes respectively illustrated in FIGS. 3 to 13 illustrate constitutions of bias electrodes that can be used instead of the bias electrodes 152*a* and 152*b* (or at least two arbitrary bias electrodes out of the six bias electrodes in the optical modulator 100).

[First Modification Example]

First, a first modification example of the bias electrodes 152*a* and 152*b* that are used in the optical modulator 100 illustrated in FIG. 1 will be described.

The bias electrodes 152*a* and 152*b* illustrated in FIG. 2 are constituted so that the bias electrodes 152*a* and 152*b* have mutually different characteristic frequencies by providing the same electrode width and mutually different electrode gaps to the electrodes constituting the bias electrodes 152*a* and 152*b* respectively which are two comb electrodes facing each other so as to make the electrode intervals different from each other.

In contrast, in the present modification example, the bias electrodes which are two comb electrodes facing each other are provided with mutually different electrode intervals by providing the same electrode gap and mutually different electrode widths to the electrodes constituting the two bias electrodes.

Therefore, the two bias electrodes are provided with mutually different characteristic frequencies, whereby interference between the two bias electrodes is prevented.

Figure 3:
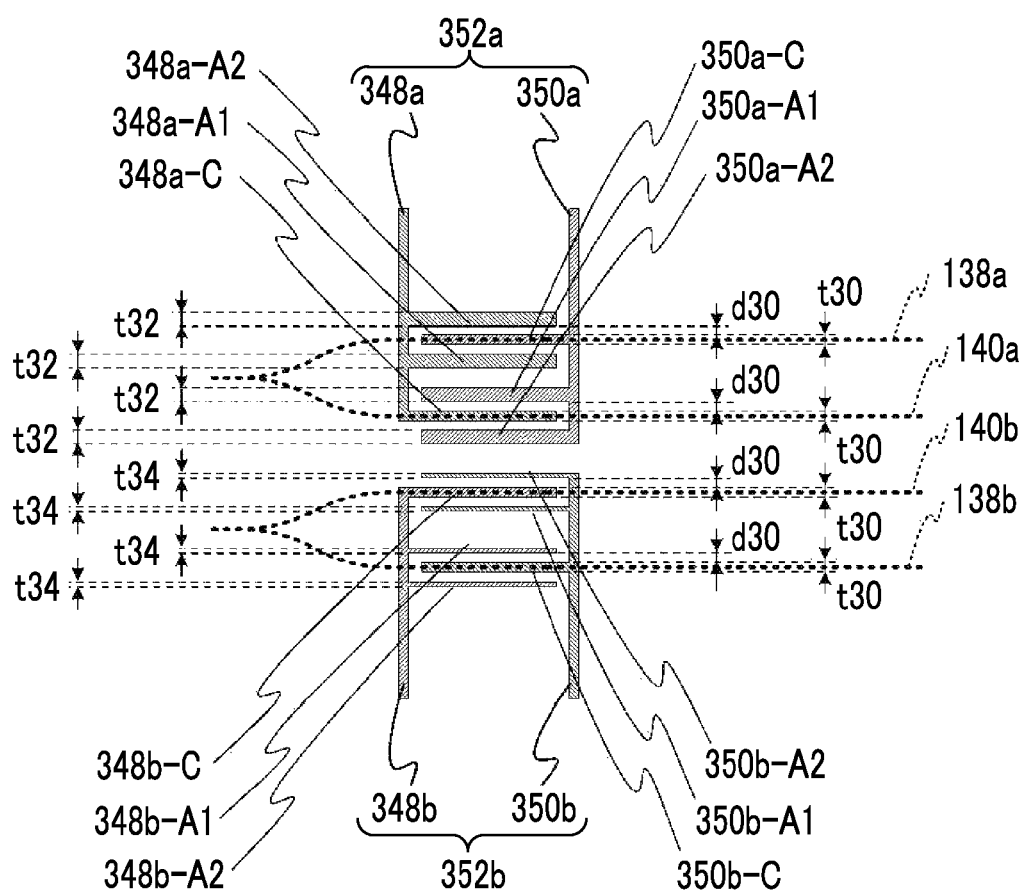
FIG. 3 is a view illustrating a first modification example of the bias electrode that can be used in the optical modulator illustrated in FIG. 1.

FIG. 3 is a view illustrating the constitution of bias electrodes 352*a* and 352*b* of the present modification example which can be used instead of the bias electrodes 152*a* and 152*b*.

The bias electrode 352*a* is a bias electrode having a push-pull constitution and has a central electrode 350*a*-C which extends from an electrode 350*a* and is formed on the optical waveguide 138*a* and a central electrode 348*a*-C which extends from an electrode 348*a* and is formed on the optical waveguide 140*a*. In addition, the bias electrode 352*a* has adjacent electrodes 348*a*-A1 and 348*a*-A2 which sandwich the central electrode 350*a*-C in the vertical direction in the drawing, run parallel to each other, and extend from the electrode 348*a* and adjacent electrodes 350*a*-A1 and 350*a*-A2 which sandwich the central electrode 348*a*-C in the vertical direction in the drawing, run parallel to each other, and extend from the electrode 350*a* (that is, the central electrodes 350*a*-C and 348*a*-C and the adjacent electrodes 348*a*-A1, 348*a*-A2, 350*a*-A1, and 350*a*-A2 are electrodes constituting a comb electrode which is the bias electrode 352*a*).

Here, the central electrodes 348*a*-C and 350*a*-C have an electrode width t30, and the adjacent electrodes 348*a*-A1, 348*a*-A2, 350*a*-A1, and 350*a*-A2 have an electrode width t32. In addition, the electrode gap between the central electrode 350*a*-C and the adjacent electrode 348*a*-A1 or 348*a*-A2 and the electrode gap between the central electrode 348*a*-C and the adjacent electrode 350*a*-A1 or 350*a*-A2 are both d30. Therefore, the electrode interval p30 in the bias electrode 352*a* is $$p30=d30+(t30+t32)/2 \quad (5),$$

and the bias electrode 352*a* has a characteristic frequency $f_0$–30 which is determined by the electrode interval p30.

The constitution of the bias electrode 352*b* is, similar to the bias electrode 352*a*, a push-pull constitution and has a central electrode 350*b*-C which extends from an electrode 350*b* and is formed on the optical waveguide 138*b* and a central electrode 348*b*-C which extends from an electrode 348*b* and is formed on the optical waveguide 140*b*. In addition, the bias electrode 352*b* has adjacent electrodes 348*b*-A1 and 348*b*-A2 which sandwich the central electrode 350*b*-C in the vertical direction in the drawing, run parallel to each other, and extend from the electrode 348*b* and adjacent electrodes 350*b*-A1 and 350*b*-A2 which sandwich the central electrode 348*b*-C in the vertical direction in the drawing, run parallel to each other, and extend from the electrode 350*b* (that is, the central electrodes 350*b*-C and 348*b*-C and the adjacent electrodes 348*b*-A1, 348*b*-A2, 350*b*-A1, and 350*b*-A2 are electrodes constituting a comb electrode which is the bias electrode 352*b*).

Here, the central electrodes 348*b*-C and 350*b*-C have the electrode width t30 which is the same as those of the central electrodes 348*a*-C and 350*a*-C in the bias electrode 352*a*, and the adjacent electrodes 348*b*-A1, 348*b*-A2, 350*b*-A1, and 350*b*-A2 have an electrode width t34 which is a different size from the electrode width t32 of the adjacent electrodes 348*b*-A1 and the like in the bias electrode 352*a*. In addition, the electrode gap between the central electrode 350*b*-C and the adjacent electrode 348*b*-A1 or 348*b*-A2 and the electrode gap between the central electrode 348*b*-C and the adjacent electrode 350*b*-A1 or 350*b*-A2 are both the same as the electrode gap d30 in the bias electrode 352*a*. Therefore, the electrode interval p32 in the bias electrode 352*b* is $$p32=d30+(t30+t34)/2 \quad (6),$$

and the bias electrode 352*b* has a characteristic frequency $f_0$–32 which is determined by the electrode interval p32.

As described above, since the electrode width t32 of the adjacent electrodes 348*a*-A1, 348*a*-A2, 350*a*-A1, and 350*a*-A2 in the bias electrode 352*a* and the electrode width t34 of the adjacent electrodes 348*b*-A1, 348*b*-A2, 350*b*-A1, and 350*b*-A2 in the bias electrode 152*b* are different from each other, the electrode interval p30 and the electrode interval p32 become different values. Therefore, the characteristic frequency $f_0$–30 of the bias electrode 352*a* and the characteristic frequency $f_0$–32 of the bias electrode 352*b* become different values.

As a result, even when a surface acoustic wave which is strongly generated in one bias electrode 352*a* (or 352*b*) and has the same frequency as the characteristic frequency $f_0$–30 (or $f_0$–32) reaches the other bias electrode 352*b* (or 352*a*) having the characteristic frequency $f_0$–32 (or $f_0$–30) which is different from the characteristic frequency $f_0$–30 (or $f_0$–32), no large electrical signal (therefore, large electrical noise) is generated in the bias electrode 352*b* (or 352*a*). That is, in the present embodiment, the two bias electrodes 352*a* and 352*b* are constituted so as to have mutually different characteristic frequencies $f_0$–30 and $f_0$–32 so as to prevent an electrical signal applied to one bias electrode 352*a* (or 352*b*) from being received by the other bias electrode 352*b* (or 352*a*) through the surface acoustic wave, whereby interference between the bias electrodes 352*a* and 352*b* through surface acoustic waves is prevented.

[Second Modification Example]

Next, a second modification example of the bias electrodes 152*a* and 152*b* that are used in the optical modulator 100 illustrated in FIG. 1 will be described. In the present modification example, a plurality of electrode intervals are provided in one bias electrode, and the periodicity of electrode disposition in the bias electrode is disarrayed so that the bias electrode has a plurality of characteristic frequencies, whereby the generation intensities of surface acoustic waves around one characteristic frequency are reduced.

For example, in the bias electrode 152*a* (or 152*b*) illustrated in FIG. 2, since the characteristic frequency of the comb electrode constituted of the central electrode 150*a*-C and the adjacent electrodes 148*a*-A1 and A2 and the characteristic frequency of the comb electrode constituted of the central electrode 148*a*-C and the adjacent electrodes 150*a*-

A1 and A2 are both $f_0$–10, surface acoustic waves having the characteristic frequency $f_0$–10 which are generated from the two comb electrodes strongly join together and are capable of propagating on the substrate 102.

In contrast, in the present modification example, different electrode intervals are provided in two comb electrode portions constituting one bias electrode, whereby the respective comb electrode portions have different characteristic frequencies. Therefore, in a case in which an electrical signal having the same frequency as any one of the characteristic frequencies is applied to the bias electrode, a surface acoustic wave is generated only from any one of the comb electrode portions. Therefore, there are no cases in which surface acoustic waves having the same frequency which are generated from the two comb electrode portions strongly join together and propagate, and the intensities of surface acoustic waves being generated from the bias electrode are reduced, whereby interference from the bias electrode to other bias electrodes through surface acoustic waves can be prevented.

Figure 4:
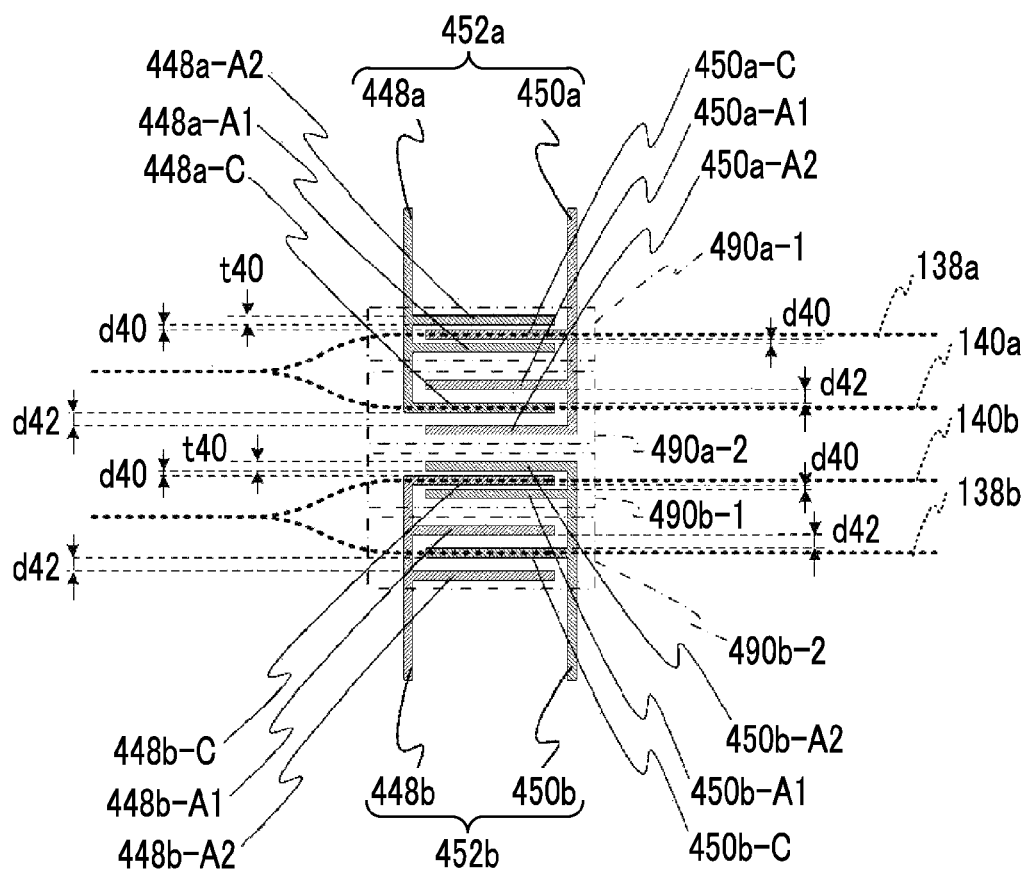
FIG. 4 is a view illustrating a second modification example of the bias electrode that can be used in the optical modulator illustrated in FIG. 1.

FIG. 4 is a view illustrating the constitution of bias electrodes 452a and 452b of the present modification example which can be used instead of the bias electrodes 152a and 152b.

The bias electrode 452a is a bias electrode having a push-pull constitution and has a central electrode 450a-C which extends from an electrode 450a and is formed on the optical waveguide 138a and a central electrode 448a-C which extends from an electrode 448a and is formed on the optical waveguide 140a. In addition, the bias electrode 452a has adjacent electrodes 448a-A1 and 448a-A2 which sandwich the central electrode 450a-C in the vertical direction in the drawing, run parallel to each other, and extend from the electrode 448a and adjacent electrodes 450a-A1 and 450a-A2 which sandwich the central electrode 448a-C in the vertical direction in the drawing, run parallel to each other, and extend from the electrode 450a.

Here, the central electrodes 448a-C and 450a-C and the adjacent electrodes 448a-A1, 448a-A2, 450a-A1, and 450a-A2 all have the same electrode width t40. On the other hand, the electrode gap between the central electrode 450a-C and the adjacent electrode 448a-A1 or A2 is d0, and the electrode gap between the central electrode 448a-C and the adjacent electrode 450a-A1 or A2 is d42 which is a different size from d40. That is, two electrode gaps of d40 and d42 are present in the bias electrode 452a, whereby the periodicity of the electrodes constituting the bias electrode 452a is disarrayed.

Therefore, the bias electrode 452a is constituted of a comb electrode portion 490a-1 constituted of the central electrode 450a-C and the adjacent electrodes 448a-A1 and A2 and a comb electrode portion 490a-2 constituted of the central electrode 448a-C and the adjacent electrodes 450a-A1 and A2. In addition, the electrode interval p40 in the comb electrode portion 490a-1 is $$p40=t40+d40 \qquad (7),$$

the electrode interval p42 in the comb electrode portion 490a-2 is $$p42=t40+d42 \qquad (8), \text{ and}$$

the comb electrode portions 490a-1 and 490a-2 have mutually different characteristic frequencies $f_0$–40 and $f_0$–42. Since the comb electrode portion 490a-1 and the comb electrode portion 490a-2 are included in the bias electrode 452a, the bias electrode 452a has two characteristic frequencies $f_0$–40 and $f_0$–42.

In addition, since the bias electrode 452a has the two comb electrode portions 490a-1 and 490a-2 having mutually different characteristic frequencies $f_0$–40 and $f_0$–42, in a case in which an electrical signal having the same frequency as any one of the characteristic frequencies $f_0$–40 and $f_0$–42 is applied to the bias electrode 452a, a surface acoustic wave is generated only from any one of the comb electrode portions 490a-1 and 490a-2. Therefore, there are no cases in which surface acoustic waves having the same frequency which are generated from the two comb electrode portions 490a-1 and 490a-2 strongly join together and propagate, and the intensities of surface acoustic waves being generated from the bias electrode 452a are reduced, whereby interference from the bias electrode 452a to other bias electrodes (for example, the bias electrode 452b) through surface acoustic waves can be prevented.

The constitution of the bias electrode 452b is the same as the constitution of the bias electrode 452a, and the bias electrode is constituted of comb electrode portions 490b-1 and 490b-2. The comb electrode portion 490b-1 has the same constitution as that of the comb electrode portion 490a-1 and has the characteristic frequency $f_0$–40. In addition, the comb electrode portion 490b-2 has the same constitution as that of the comb electrode portion 490a-2 and has the characteristic frequency $f_0$–42. Therefore, in the bias electrode 452b as well, similar to the bias electrode 452a, interference from the bias electrode 452b to other bias electrodes (for example, the bias electrode 452a) through surface acoustic waves can be prevented by reducing the intensities of surface acoustic waves that are generated from the bias electrode 452b.

Particularly, in the constitution illustrated in FIG. 4, two comb electrode portions having the same characteristic frequency (for example, the comb electrode portions 490a-1 and 490b-1 having the characteristic frequency $f_0$–40) are not disposed adjacent to each other, which is preferable from the viewpoint of reducing interference between the two comb electrode portions having the same characteristic frequency.

Meanwhile, in the constitution of the bias electrode 452a (or 452b) described in the present modification example, the generation intensities of surface acoustic waves around the characteristic frequency which are generated from one bias electrode are reduced, and, when at least one bias electrode out of a plurality of bias electrode in the optical modulator 100 has the above-described constitution, an effect of preventing interference from the bias electrode to other bias electrodes through surface acoustic waves can be expected.

[Third Modification Example]

Next, a third modification example of the bias electrodes 152a and 152b that are used in the optical modulator 100 illustrated in FIG. 1 will be described.

In the second modification example illustrated in FIG. 4, the two bias electrodes 452a and 452b disposed so as to face each other are constituted so as to respectively have the same two different characteristic frequencies $f_0$–40 and $f_0$–42 (that is, both the bias electrode 452a and the bias electrode 452b have the characteristic frequencies $f_0$–40 and $f_0$–42).

In contrast, in the present modification example, two bias electrodes disposed so as to face each other respectively have two characteristic frequencies, and the two characteristic frequencies of one bias electrode are both different from the two characteristic frequencies of the other bias electrode.

Therefore, in the present modification example, similar to the second modification example, the generation intensities of surface acoustic waves around the characteristic frequencies are reduced, and the receiving sensitivity of surface acoustic waves generated from one bias electrode in the other bias electrode is reduced. That is, the frequencies of surface acoustic waves generated from one bias electrode are prevented from coinciding with any one of the characteristic frequencies of the other bias electrode, and thus the power of noise signals induced in other bias electrodes due to the surface acoustic waves is reduced, whereby interference between the bias electrodes is further prevented.

Figure 5:
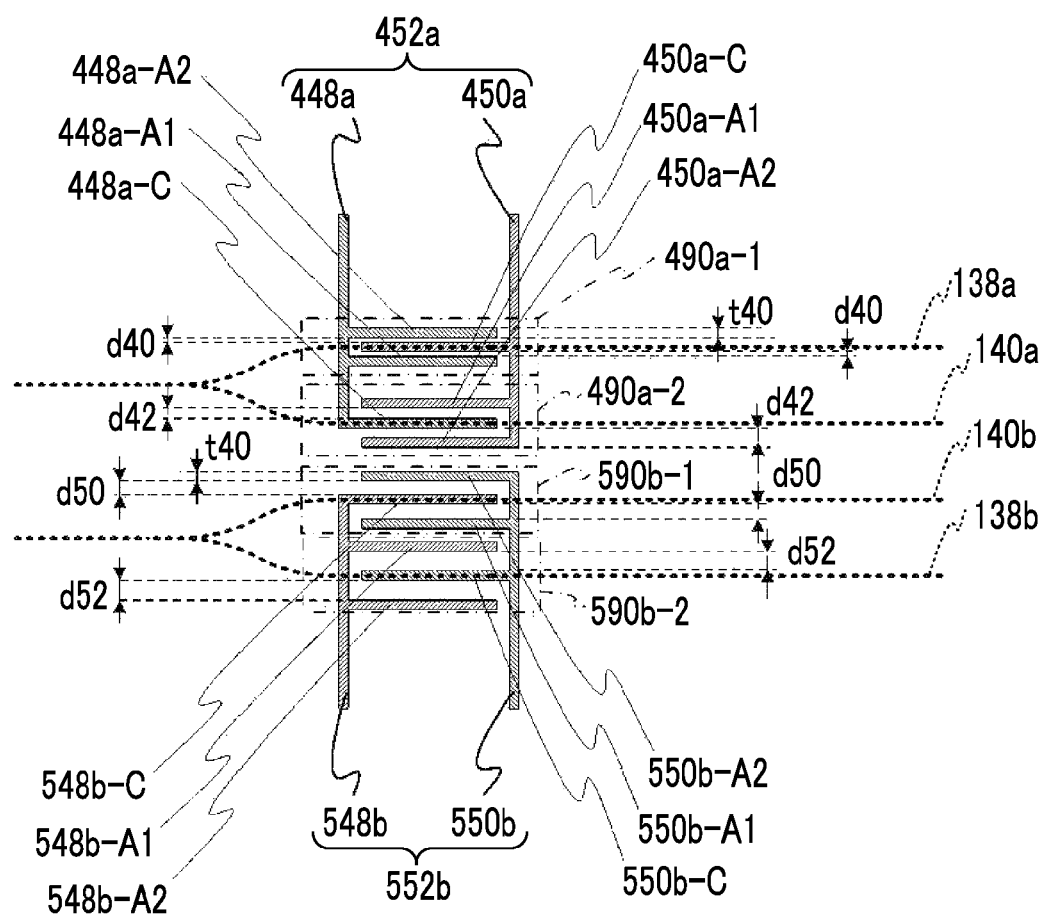
FIG. 5 is a view illustrating a third modification example of the bias electrode that can be used in the optical modulator illustrated in FIG. 1.

FIG. 5 is a view illustrating the constitution of the bias electrodes according to the present modification example. Meanwhile, in FIG. 5, the same constituent elements as those in the bias electrodes according to the second modification example, which is illustrated in FIG. 4, will be given the same reference sign as the reference sign in FIG. 4, and the above-described description of the second modification example is incorporated herein by reference.

Bias electrodes illustrated in FIG. 5 have the same constitution as that of the bias electrodes illustrated in FIG. 4, but a bias electrode 552b is provided instead of the bias electrode 452b. The bias electrode 552b is a bias electrode having a push-pull constitution and has a central electrode 550b-C which extends from an electrode 550b and is formed on the optical waveguide 138b and a central electrode 548b-C which extends from an electrode 548b and is formed on the optical waveguide 140b. In addition, the bias electrode 552b has adjacent electrodes 548b-A1 and 548b-A2 which sandwich the central electrode 550b-C in the vertical direction in the drawing, run parallel to each other, and extend from the electrode 548b and adjacent electrodes 550b-A1 and 550b-A2 which sandwich the central electrode 548b-C in the vertical direction in the drawing, run parallel to each other, and extend from the electrode 550b.

Here, the central electrodes 548b-C and 550b-C and the adjacent electrodes 548b-A1, 548b-A2, 550b-A1, and 550b-A2 all have the same electrode width t40, but the electrode gap between the central electrode 550b-C and the adjacent electrode 548b-A1 or A2 is d50, and the electrode gap between the central electrode 548b-C and the adjacent electrode 550b-A1 or A2 is d52 which is a different size from d50. That is, two electrode gaps of d50 and d52 are present in the bias electrode 552b, whereby the periodicity of the electrodes constituting the bias electrode 552b is disarrayed.

Therefore, the bias electrode 552b is constituted of a comb electrode portion 590b-1 constituted of the central electrode 548b-C and the adjacent electrodes 550b-A1 and A2 and a comb electrode portion 590b-2 constituted of the central electrode 550b-C and the adjacent electrodes 548b-A1 and A2. In addition, the electrode interval p50 in the comb electrode portion 590b-1 is $$p50 = t40 + d50 \quad (9),$$

the electrode interval p52 in the comb electrode portion 590a-2 is $$p52 = t40 + d52 \quad (10), \text{ and}$$

the comb electrode portions 590b-1 and 590b-2 respectively have different characteristic frequencies $f_0$–50 and $f_0$–52. Since the comb electrode portion 590b-1 and 590b-2 are included in the bias electrode 552b, the periodicity of the electrodes constituting the bias electrode 552b is disarrayed as described above, and thus the bias electrode 552b has two characteristic frequencies $f_0$–50 and $f_0$–52.

In addition, in the present modification example, particularly, the electrode gaps d50 and d 52 in the bias electrode 552b do not coincide with the electrode gaps d40 and d42 in the bias electrode 452a. As a result, the electrode intervals p50 and p52 in the bias electrode 552b do not coincide with any one of the electrode intervals p40 and p42 in the bias electrode 452a, and the bias electrode 552b has the characteristic frequencies $f_0$–50 and $f_0$–52 which do not coincide with any one of the characteristic frequencies $f_0$–40 and $f_0$–42 of the bias electrode 452a.

[Fourth Modification Example]

Next, a fourth modification example of the bias electrodes 152a and 152b that are used in the optical modulator 100 illustrated in FIG. 1 will be described.

In bias electrodes according to the third modification example which is illustrated in FIG. 5, the same electrode width is provided in all of the electrodes constituting four comb electrode portions which are included in two bias electrodes, and different electrode gaps are provided in each of the comb electrode portions, whereby the bias electrodes have different electrode intervals and different characteristic frequencies.

In contrast, in the present modification example, the same electrode gap is provided in four comb electrode portions included in two bias electrodes, and different electrode widths are provided in each of the comb electrode portions, whereby different electrode intervals are provided in each of the comb electrode portions, and the bias electrodes have different characteristic frequencies.

Therefore, in the present modification example, similar to the third modification example, the generation intensities of surface acoustic waves around the characteristic frequencies are reduced, and the receiving sensitivity of surface acoustic waves generated from one bias electrode in the other bias electrode is reduced, whereby interference between the bias electrodes is prevented.

Figure 6:
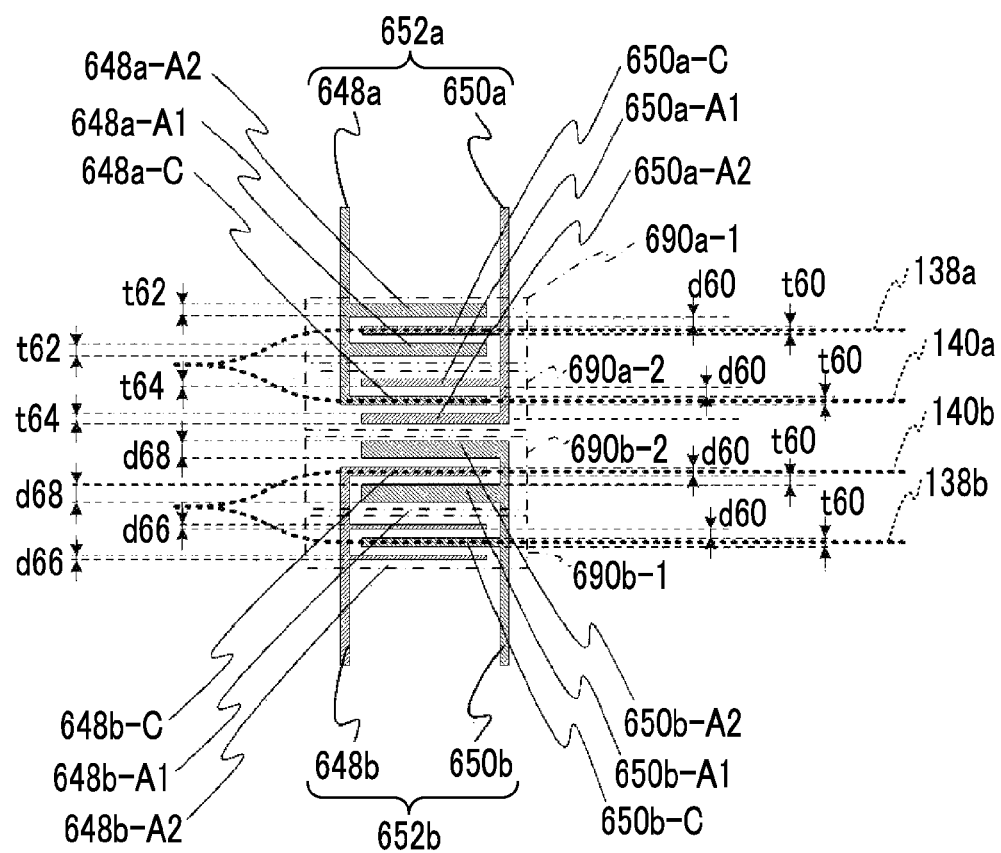
FIG. 6 is a view illustrating a fourth modification example of the bias electrode that can be used in the optical modulator illustrated in FIG. 1.

FIG. 6 is a view illustrating the constitution of bias electrodes 652a and 652b according to the present modification example which can be used instead of the bias electrodes 152a and 152b.

The bias electrode 652a is constituted of two comb electrode portions 690a-1 and 690a-2. The comb electrode portion 690a-1 includes a central electrode 650a-C which extends from an electrode 650a and is formed on the optical waveguide 138a and adjacent electrodes 648a-A1 and A2 which sandwich the central electrode 650a-C in the vertical direction in the drawing, run parallel to each other, and extend from the electrode 648a.

The comb electrode portion 690a-2 includes a central electrode 648a-C which extends from an electrode 648a and is formed on the optical waveguide 140a and adjacent electrodes 650a-A1 and A2 which sandwich the central electrode 648a-C in the vertical direction in the drawing, run parallel to each other, and extend from the electrode 650a.

In addition, the bias electrode 652b is constituted of two comb electrode portions 690b-1 and 690b-2. The comb electrode portion 690b-1 includes a central electrode 650b-C which extends from an electrode 650b and is formed on the optical waveguide 138b and adjacent electrodes 648b-A1 and A2 which sandwich the central electrode 650b-C in the vertical direction in the drawing, run parallel to each other, and extend from the electrode 648b.

The comb electrode portion 690b-2 includes a central electrode 648b-C which extends from an electrode 648b and is formed on the optical waveguide 140b and adjacent electrodes 650b-A1 and A2 which sandwich the central electrode 648b-C in the vertical direction in the drawing, run parallel to each other, and extend from the electrode 650b.

In the above-described constitution, the same electrode gap d60 is provided in all of the comb electrode portions 690a-1, 690a-2, 690b-1, and 690b-2, and the central electrodes 650a-C, 648a-C, 650b-C, and 648b-C all have the same electrode width t60. On the other hand, in the comb electrode portions 690a-1, 690a-2, 690b-1, and 690b-2, the adjacent electrodes 648a-A1 and A2, 650a-A1 and A2, 648b-A1 and A2, and an d650b-A1 and A2 have mutually different electrode widths t62, t64, t66, and t68.

Therefore, the comb electrode portions 690a-1, 690a-2, 690b-1, and 690b-2 are provided with mutually different electrode intervals p60, p62, p64, and p66 and have mutually different characteristic frequencies $f_0$–60, $f_0$–62, $f_0$–64, and $f_0$–66. As a result, the bias electrode 652a and 652b respectively have two mutually different characteristic frequencies $f_0$–60 and $f_0$–62, and $f_0$–64 and $f_0$–66, and the generation intensities of surface acoustic waves around the characteristic frequencies are respectively reduced. In addition, simultaneously, the receiving sensitivity of surface acoustic waves generated from one bias electrode 652a (or 652b) in the other bias electrode 652b (or 652a) is reduced, whereby interference between the bias electrodes 652a and 652b can be prevented.

[Fifth Modification Example]

Next, a fifth modification example of the bias electrodes 152a and 152b that are used in the optical modulator 100 illustrated in FIG. 1 will be described. In the present modification example, one bias electrode is constituted so that an interval between electrodes constituting the bias electrode changes stepwise along the longitudinal direction of the electrodes so that the bias electrode has a plurality of characteristic frequencies, and the uniformity of electrode shapes in the bias electrode is disarrayed, whereby the generation intensities of surface acoustic waves around one characteristic frequency are reduced.

Figure 7:
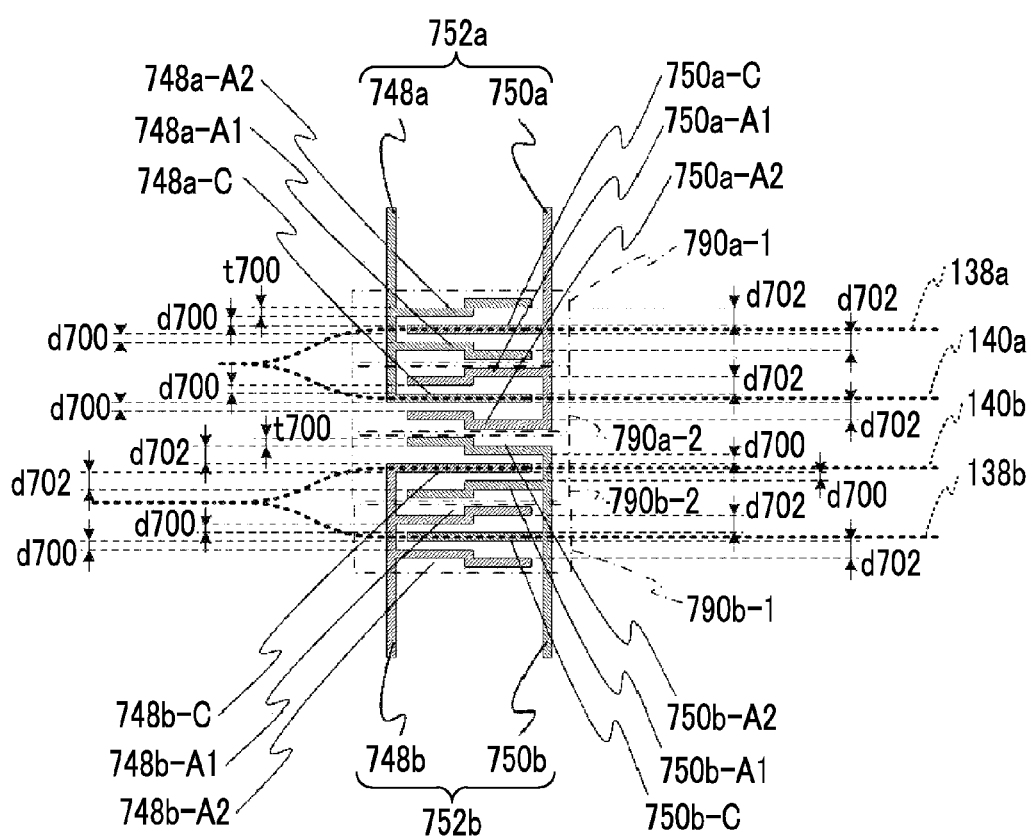
FIG. 7 is a view illustrating a fifth modification example of the bias electrode that can be used in the optical modulator illustrated in FIG. 1.

FIG. 7 is a view illustrating the constitution of bias electrodes 752a and 752b according to the present modification example which can be used instead of the bias electrodes 152a and 152b.

The bias electrode 752a is constituted of two comb electrode portions 790a-1 and 790a-2. The comb electrode portion 790a-1 includes a central electrode 750a-C which extends from an electrode 750a and is formed on the optical waveguide 138a and adjacent electrodes 748a-A1 and A2 which sandwich the central electrode 750a-C in the vertical direction in the drawing, run parallel to each other, and extend from the electrode 748a. Here, the central electrode 750a-C and the adjacent electrodes 748a-A1 and A2 all have the same electrode width t700.

Particularly, in the comb electrode portion 790a-1, the adjacent electrodes 748a-A1 and A2 respectively bend at substantially the central portion of the electrode in the longitudinal direction, and the electrode gap between the central electrode 750a-C and the adjacent electrode 748a-A1 or A2 increases stepwise from d700 to d702 from the left to the right in the drawing at the bending portion. Therefore, the comb electrode portion 790a-1 has different electrode intervals p700 (=t700+d700) and p702 (t700+d702) at a portion on the left side in the drawing in which the electrode gap is d700 and a portion on the right side in the drawing in which the electrode gap is d702 and have mutually different characteristic frequencies $f_0$–70 and $f_0$–72 at the respective portions.

The constitution of the comb electrode portion 790a-2 is the same as the constitution of the comb electrode portion 790a-1. Therefore, the comb electrode portion 790a-2 also has mutually different characteristic frequencies $f_0$–70 and $f_0$–72 in this constitution. Therefore, the bias electrode 752a has two mutually different characteristic frequencies $f_0$–70 and $f_0$–72, and the length (the length in the horizontal direction in the drawing) of electrode portions having the respective characteristic frequencies in the electrodes constituting the bias electrode 752a reaches half the length of the entire electrode, and thus the generation intensities of surface acoustic waves at the respective characteristic frequencies is reduced.

The constitution of the bias electrode 752b is slightly different from the constitution of the bias electrode 752a. In the above-described bias electrode 752a, both the comb electrode portions 790a-1 and 790a-2 have portions having the electrode gap d700 on the left side in the drawing and have portions having the electrode gap d702 on the right side in the drawing. In contrast, in the above-described bias electrode 752b, a comb electrode portion 790b-1 constituting the bias electrode 752 has portions having the electrode gap d700 (portions having the characteristic frequency $f_0$–70) on the left side in the drawing and has portions having the electrode gap d702 (portions having the characteristic frequency $f_0$–72) on the right side in the drawing, and a comb electrode portion 790b-2 has portions having the electrode gap d702 (portions having the characteristic frequency $f_0$–72) on the left side in the drawing and has portions having the electrode gap d700 (portions having the characteristic frequency $f_0$–70) on the right side in the drawing.

Therefore, the bias electrode 752b also, similar to the bias electrode 752a, has two characteristic frequencies $f_0$–70 and $f_0$–72, and thus the generation intensities of surface acoustic waves at the respective characteristic frequencies are reduced. In addition, portions in the comb electrode portion 790b-2 which are adjacent to portions having the characteristic frequency $f_0$–70 (or portions having the characteristic frequency $f_0$–72) in the comb electrode portion 790b-1 have the characteristic frequency $f_0$–72 (or the characteristic frequency $f_0$–70), and thus there are no cases in which surface acoustic waves having the same frequency are generated at the same time from the respective portions and strongly join together, and the generation intensities of surface acoustic waves can be further reduced.

Meanwhile, the constitution of the bias electrode 752a (or 752b) described in the present modification example reduces the generation intensities of surface acoustic waves around the characteristic frequencies which are generated from one bias electrode, and, when at least one bias electrode out of a plurality of bias electrodes in the optical modulator 100 have the above-described constitution, an effect of preventing interference from the bias electrode to other bias electrodes through surface acoustic waves can be expected.

[Sixth Modification Example]

Next, a sixth modification example of the bias electrodes 152a and 152b that are used in the optical modulator 100 illustrated in FIG. 1 will be described. In the present modification example, an interval between electrodes constituting one bias electrode is continuously changed (for example, is increased and/or decreased) linearly along the longitudinal direction of the electrodes so that the bias electrode has characteristic frequencies distributed in a predetermined frequency range, and the uniformity of the electrode intervals in the bias electrode is disarrayed, whereby the generation intensities of surface acoustic waves around one characteristic frequency are reduced.

That is, in the present modification example, since the electrode intervals change in the longitudinal direction of the electrode constituting the bias electrode, the bias electrode acts as an assembly of fine comb electrodes having a short length in which electrode intervals are different (and thus the bias electrode has different characteristic frequencies). As a result, the generation intensities of surface acoustic waves around the characteristic frequencies (that is, the intensities of surface acoustic waves that are respectively generated from the fine comb electrodes) becomes extremely small, and interference between bias electrodes through the surface acoustic waves is prevented.

Figure 8:
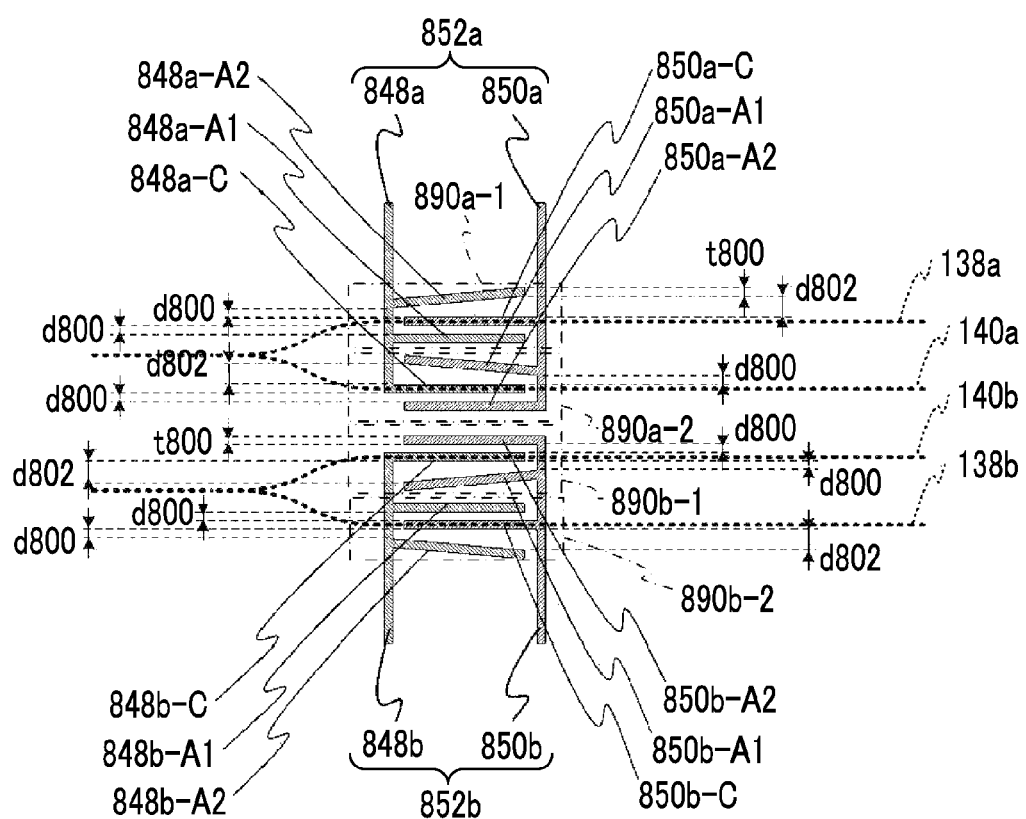
FIG. 8 is a view illustrating a sixth modification example of the bias electrode that can be used in the optical modulator illustrated in FIG. 1.

FIG. 8 is a view illustrating the constitution of bias electrodes 852a and 852b according to the present modification example which can be used instead of the bias electrodes 152a and 152b. Meanwhile, the bias electrode 852b has the same constitution as the bias electrode 852a, only the constitution of the bias electrode 852a will be described below.

The bias electrode 852a is constituted of two comb electrode portions 890a-1 and 890a-2. The comb electrode portion 890a-1 includes a central electrode 850a-C which extends from an electrode 850a and is formed on the optical waveguide 138a and adjacent electrodes 848a-A1 and A2 which sandwich the central electrode 850a-C in the vertical direction in the drawing, run parallel to each other, and extend from the electrode 848a. Here, the central electrode 850a-C and the adjacent electrodes 848a-A1 and A2 all have the same electrode width t800.

Particularly, in the comb electrode portion 890a-1, the electrode gap between the central electrode 850a-C and the adjacent electrode 848a-A1 is as constant as d800, but the electrode gap between the central electrode 850a-C and the adjacent electrode 848a-A2 continuously increases linearly from d800 to d802 from the left to the right in the drawing. Therefore, the comb electrode portion 890a-1 has an electrode interval that increases linearly from p800 (=t800+d800) to p802 (t800+d802) and has characteristic frequencies distributed in a predetermined range $f_0$–80 to $f_0$–82 in which the lower frequency $f_0$–80 and the upper frequency $f_0$–82 are determined by the electrode intervals p802 and p800.

As a result, for example, the range of an electrode having one characteristic frequency in the longitudinal direction of the central electrode 850a-C becomes extremely small, and the intensities of surface acoustic waves having the same characteristic frequency as the above-described characteristic frequency (that is, the power spectrum densities of the surface acoustic waves) become extremely small, and thus interference between bias electrodes through the surface acoustic waves is prevented.

Similarly, the comb electrode portion 890a-2 includes a central electrode 848a-C which extends from an electrode 848a and is formed on the optical waveguide 140a and adjacent electrodes 850a-A1 and A2 which sandwich the central electrode 848a-C in the vertical direction in the drawing, run parallel to each other, and extend from the electrode 850a. Here, the central electrode 848a-C and the adjacent electrodes 850a-A1 and A2 all have the same electrode width t800.

Particularly, in the comb electrode portion 890a-2, the electrode gaps between the central electrode 848a-C and the adjacent electrode 850a-A1 continuously decrease linearly from d802 to d800 from the left to the right in the drawing. Therefore, the comb electrode portion 890a-2 has an electrode interval that decreases linearly from p802 (=t800+d802) to p800 (t800+d800) and has characteristic frequencies distributed in the predetermined range $f_0$–80 to $f_0$–82 in which the lower frequency $f_0$–80 and the upper frequency $f_0$–82 are determined by the electrode intervals p802 and p800.

Therefore, in the comb electrode portion 890a-2 as well, the power spectrum densities of surface acoustic waves in the predetermined frequency range become extremely small, and thus interference between bias electrodes through the surface acoustic waves is prevented.

As a result, the bias electrode 852a, as a whole, has characteristic frequencies distributed in the predetermined range $f_0$–80 to $f_0$–82, and the power spectrum densities of surface acoustic waves in the predetermined frequency range become extremely small, and thus interference from the bias electrode 852a to other bias electrodes (for example, the bias electrode 852b) is prevented.

Meanwhile, in the constitution illustrated in FIG. 8, particularly, the electrode interval in the comb electrode portion 890a-1 increases and the electrode interval in the comb electrode portion 890a-2 decreases from the left to the right in the drawing. Therefore, as an electrical signal that is applied to the bias electrode 852a approximates to the lower frequency $f_0$–80 or the upper frequency $f_0$–82 of the predetermined frequency range, generation sources of surface acoustic waves having the same frequency which are generated in the comb electrode portion 890a-1 and the comb electrode portion 890a-2 become far away from each other. As a result, in the constitution illustrated in FIG. 8, it becomes difficult for two surface acoustic waves having the same frequency which are generated at the same time in the comb electrode portion 890a-1 and the comb electrode portion 890a-2 to be superimposed on each other. That is, the constitution illustrated in FIG. 8 has not only an effect of reducing the power spectrum densities of surface acoustic waves but also an effect of avoiding the intensity addition of surface acoustic waves and is desirable from the viewpoint of reducing the generation intensities of surface acoustic waves.

Meanwhile, the constitution of the bias electrode 852a (or 852b) described in the present modification example reduces the generation intensities of surface acoustic waves around the characteristic frequencies which are generated from one bias electrode, and, when at least one bias electrode out of a plurality of bias electrodes in the optical modulator 100 have the above-described constitution, an effect of preventing interference from the bias electrode to other bias electrodes through surface acoustic waves can be expected.

[Seventh Modification Example]

Next, a seventh modification example of the bias electrodes 152a and 152b that are used in the optical modulator 100 illustrated in FIG. 1 will be described.

In the present modification example, similar to the sixth modification example, one bias electrode is constituted so that the interval between electrodes constituting the bias electrode is continuously changed (for example, is increased and/or decreased) linearly along the longitudinal direction of the electrodes so that the bias electrode has characteristic frequencies distributed in a predetermined frequency range. Therefore, the uniformity of the electrode intervals in the bias electrode is disarrayed, and the generation intensities of surface acoustic waves around one characteristic frequency are reduced. In the sixth modification example, the electrode interval is changed by continuously changing the electrode gap linearly while maintaining the electrode width of the bias electrode constant; however, in the present modification example, the electrode interval is changed by continuously changing the electrode width linearly while maintaining the electrode gap constant.

Figure 9:
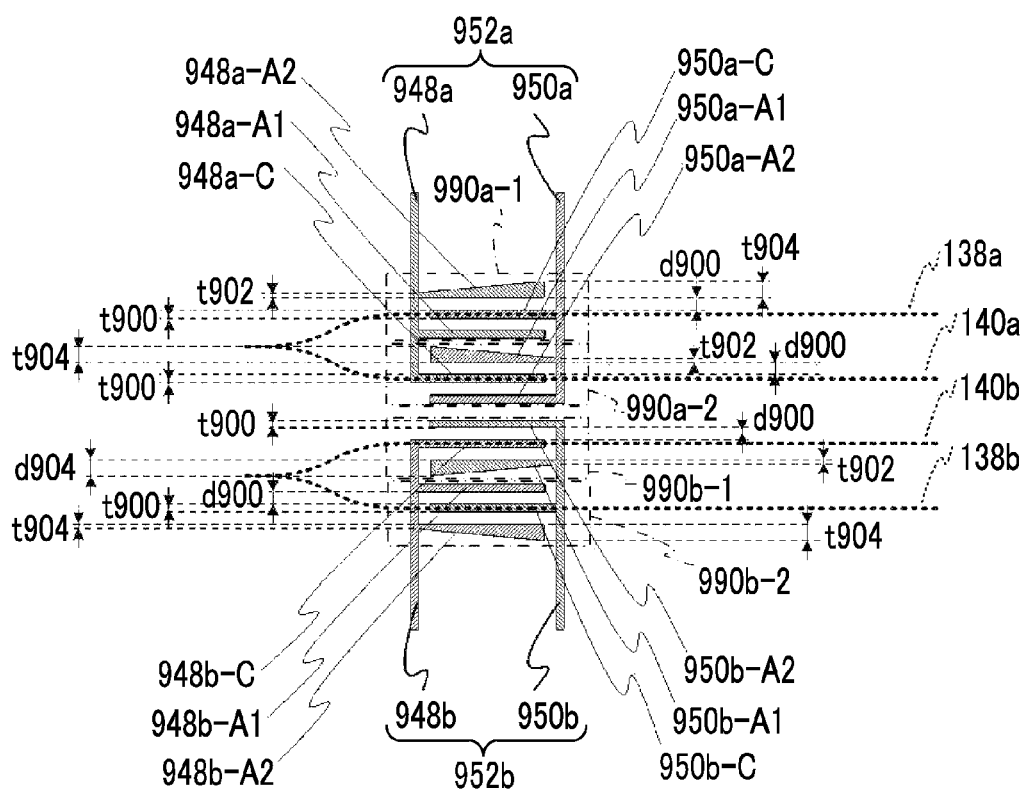
FIG. 9 is a view illustrating a seventh modification example of the bias electrode that can be used in the optical modulator illustrated in FIG. 1.

FIG. 9 is a view illustrating the constitution of bias electrodes 952a and 952b according to the present modification example which can be used instead of the bias electrodes 152a and 152b.

The bias electrode 952a is constituted of two comb electrode portions 990a-1 and 990a-2. The comb electrode portion 990a-1 includes a central electrode 950a-C which extends from an electrode 950a and is formed on the optical waveguide 138a and adjacent electrodes 948a-A1 and A2 which sandwich the central electrode 950a-C in the vertical direction in the drawing, run parallel to each other, and extend from the electrode 948a. Here, the central electrode 950a-C and the adjacent electrodes 948a-A1 and A2 all have the same electrode gap d900.

Particularly, in the comb electrode portion 990a-1, the electrode widths of the central electrode 950a-C and the adjacent electrode 948a-A1 are as constant as t900, but the electrode width of the adjacent electrode 948a-A2 continuously increases linearly from t902 to t904 from the left to the right in the drawing. Therefore, the comb electrode portion 990a-1 has an electrode interval that increases linearly from p900 (=d900+(t900+t902)/2) to p902 (=d900+(t900+t904)/2) and has characteristic frequencies distributed in a predetermined range $f_0-90$ to $f_0-92$ in which the lower frequency $f_0-90$ and the upper frequency $f_0-92$ are determined by the electrode intervals p902 and p900.

Similarly, the comb electrode portion 990a-2 includes a central electrode 948a-C which extends from an electrode 948a and is formed on the optical waveguide 140a and adjacent electrodes 950a-A1 and A2 which sandwich the central electrode 948a-C in the vertical direction in the drawing, run parallel to each other, and extend from the electrode 950a. Here, the central electrode 948a-C and the adjacent electrodes 950a-A1 and A2 all have the same electrode gap d900.

Particularly, in the comb electrode portion 990a-2, the electrode widths of the central electrode 948a-C and the adjacent electrode 950a-A2 are as constant as t900, but the electrode width of the adjacent electrode 950a-A1 continuously increases linearly from t904 to t902 from the left to the right in the drawing. Therefore, the comb electrode portion 990a-2 has an electrode interval that decreases linearly from p902 (=d900+(t900+t904)/2) to p900 (=d900+(t900+t902)/2) and has characteristic frequencies distributed in the predetermined range $f_0-90$ to $f_0-92$ in which the lower frequency $f_0-90$ and the upper frequency $f_0-92$ are determined by the electrode intervals p902 and p900.

Therefore, the bias electrode 952a has characteristic frequencies distributed in the predetermined range $f_0-90$ to $f_0-92$, and the power spectrum densities of surface acoustic waves that are generated in the predetermined frequency range become extremely small, and thus interference from the bias electrode 952a to other bias electrodes (for example, the bias electrode 952b) is prevented.

The constitution of the bias electrode 952b is the same as the above-described constitution of the bias electrode 952a and thus will not be described.

Meanwhile, the constitution of the bias electrode 952a (or 952b) described in the present modification example reduces the generation intensities of surface acoustic waves around the characteristic frequencies which are generated from one bias electrode, and, when at least one bias electrode out of a plurality of bias electrodes in the optical modulator 100 have the above-described constitution, an effect of preventing interference from the bias electrode to other bias electrodes through surface acoustic waves can be expected.

[Eighth Modification Example]

Next, an eighth modification example of the bias electrodes 152a and 152b that are used in the optical modulator 100 illustrated in FIG. 1 will be described.

In the present modification example, similar to the sixth modification example, one bias electrode is constituted so that electrode intervals between electrodes constituting the bias electrode are continuously changed in the longitudinal direction of the electrodes so that the bias electrode has characteristic frequencies distributed in a predetermined frequency range. Therefore, the uniformity of the electrode intervals in the bias electrode is disarrayed, and the generation intensities of surface acoustic waves around one characteristic frequency are reduced. In the sixth modification example, the electrode interval in the bias electrode is changed linearly; however, in the present modification example, the electrode interval in the bias electrode is changed non-linearly (for example, in a curved pattern).

Figure 10:
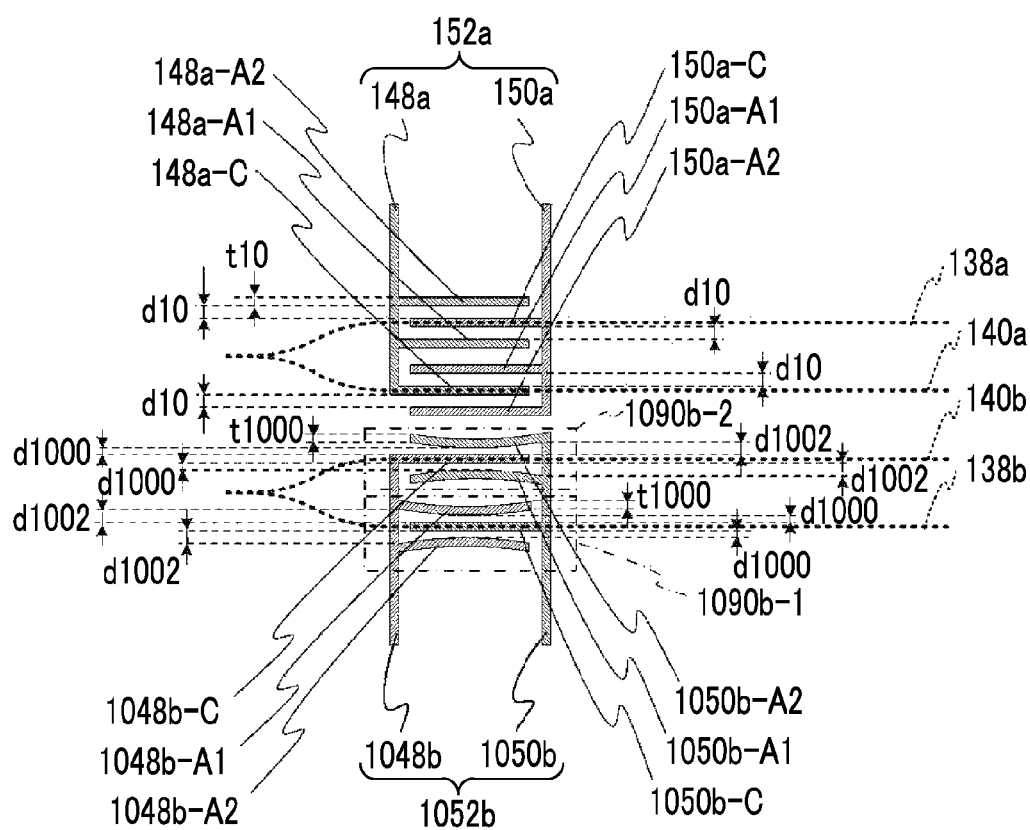
FIG. 10 is a view illustrating an eighth modification example of the bias electrode that can be used in the optical modulator illustrated in FIG. 1.

FIG. 10 is a view illustrating the constitution of bias electrodes according to the present modification. Meanwhile, in FIG. 10, the same constituent elements as those in the bias electrodes according to the first embodiment, which is illustrated in FIG. 2, will be given the same reference sign as the reference sign in FIG. 2, and the above-described description of the bias electrode according to the first embodiment is incorporated herein by reference.

In the present modification example, the bias electrode 152a illustrated in FIG. 2 is provided, and a bias electrode 1052b is provided instead of the bias electrode 152b illustrated in FIG. 2.

The bias electrode 1052b is constituted of two comb electrode portions 1090b-1 and 1090b-2. The comb electrode portion 1090b-1 includes a central electrode 1050b-C which extends from an electrode 1050b and is formed on the optical waveguide 138b and adjacent electrodes 1048b-A1 and A2 which sandwich the central electrode 1050b-C in the vertical direction in the drawing, run parallel to each other, and extend from the electrode 1048b. Here, the central electrode 1050b-C and the adjacent electrodes 1048b-A1 and A2 all have the same electrode width t1000.

Particularly, the adjacent electrode 1048b-A1 forms a curved shape that protrudes downward in the drawing, and the adjacent electrode 1048b-A2 forms a curved shape that protrudes upward in the drawing. Therefore, the electrode gaps between the electrode 1050b-C and the adjacent electrodes 1048b-A1 and A2 change in a curved pattern in a range of d1000 to d1002. As a result, the comb electrode portion 1090b-1 has an electrode interval that changes in a curved pattern in a range of p1000 (=t1000+d1000) to p1002 (=t1000+d1002) and has characteristic frequencies distributed in a predetermined range $f_0-100$ to $f_0-102$ in which the lower frequency $f_0-100$ and the upper frequency $f_0-102$ are determined by the electrode intervals p1002 and p1000.

Similarly, the comb electrode portion 1090b-2 includes a central electrode 1048b-C which extends from the electrode 1048b and is formed on the optical waveguide 140b and adjacent electrodes 1050b-A1 and A2 which sandwich the central electrode 1048b-C in the vertical direction in the drawing, run parallel to each other, and extend from the electrode 1050b. Here, the central electrode 1048b-C and the adjacent electrodes 1050b-A1 and A2 all have the same electrode width t1000.

Particularly, the adjacent electrode 1050b-A1 forms a curved shape that protrudes upward in the drawing, and the adjacent electrode 1050b-A2 forms a curved shape that protrudes downward in the drawing. Therefore, the electrode gaps between the electrode 1048b-C and the adjacent electrodes 1050b-A1 and A2 change in a curved pattern in a range of d1000 to d1002. As a result, the comb electrode portion 1090b-2 has an electrode interval that changes in a curved pattern in a range of p1000 (=t1000+d1000) to p1002

(=t1000+d1002) and has characteristic frequencies distributed in the predetermined range $f_0$–100 to $f_0$–102 in which the lower frequency $f_0$–100 and the upper frequency $f_0$–102 are determined by the electrode intervals p1002 and p1000.

Therefore, the bias electrode 1052b has characteristic frequencies distributed in the predetermined range $f_0$–100 to $f_0$–102, and the power spectrum densities of surface acoustic waves that are generated in the predetermined frequency range become extremely small, and thus interference from the bias electrode 1052b to other bias electrodes (for example, the bias electrode 152a) is prevented.

Meanwhile, the constitution of the bias electrode 1052b described in the present modification example reduces the generation intensities of surface acoustic waves around the characteristic frequencies which are generated from one bias electrode, and, when at least one bias electrode out of a plurality of bias electrodes in the optical modulator 100 have the above-described constitution, an effect of preventing interference from the bias electrode to other bias electrodes through surface acoustic waves can be expected.

[Ninth Modification Example]

Next, a ninth modification example of the bias electrodes 152a and 152b that are used in the optical modulator 100 illustrated in FIG. 1 will be described.

In the present modification example, electrodes constituting one bias electrode are formed along a non-linear shape of an optical waveguide so that an electric field is applied to the optical waveguide that is formed in a non-linear pattern (for example, in a curved pattern). Therefore, the propagation directions of surface acoustic waves that are generated from individual positions along the longitudinal directions of individual electrodes constituting the bias electrode which are formed in a non-linear shape become mutually different from each other, and thus surface acoustic waves that are generated from the bias electrode do not propagate in a single direction but dissipate, and thus the intensities of the surface acoustic waves reaching other bias electrodes can be reduced. As a result, interference from one electrode to other electrodes through surface acoustic waves is prevented.

Figure 11:
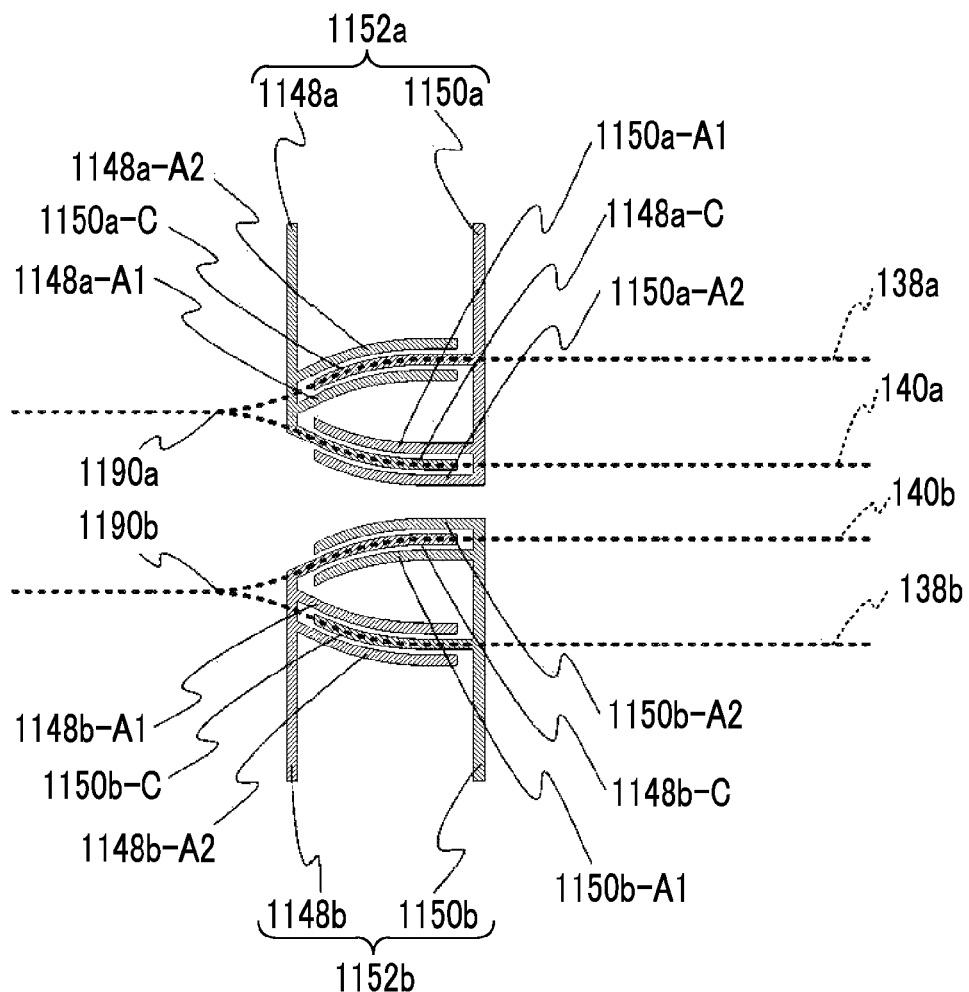
FIG. 11 is a view illustrating a ninth modification example of the bias electrode that can be used in the optical modulator illustrated in FIG. 1.

FIG. 11 is a view illustrating the constitution of bias electrodes 1152a and 1152b according to the present modification example which can be used instead of the bias electrodes 152a and 152b.

The bias electrode 1152a includes a central electrode 1150a-C which extends from an electrode 1150a and is formed on the optical waveguide 138a and a central electrode 1148a-C which extends from an electrode 1148a and is formed on the optical waveguide 140a. In addition, the bias electrode 1152a includes adjacent electrodes 1148a-A1 and A2 which sandwich the central electrode 1150a-C in the vertical direction in the drawing, run parallel to each other, and extend from the electrode 1148a and adjacent electrodes 1150a-A1 and A2 which sandwich the central electrode 1148a-C in the vertical direction in the drawing, run parallel to each other, and extend from the electrode 1150a (that is, the central electrodes 1150a-C and 1148a-C and the adjacent electrodes 1148a-A1, 1148a-A2, 1150a-A1, and 1150a-A2 are electrodes constituting a comb electrode which is the bias electrode 1152a).

Similarly, the bias electrode 1152b includes a central electrode 1150b-C which extends from an electrode 1150b and is formed on the optical waveguide 138b and a central electrode 1148b-C which extends from an electrode 1148b and is formed on the optical waveguide 140b. In addition, the bias electrode 1152b includes adjacent electrodes 1148b-A1 and A2 which sandwich the central electrode 1150b-C in the vertical direction in the drawing, run parallel to each other, and extend from the electrode 1148b and adjacent electrodes 1150b-A1 and A2 which sandwich the central electrode 1148b-C in the vertical direction in the drawing, run parallel to each other, and extend from the electrode 1150b (that is, the central electrodes 1150b-C and 1148b-C and the adjacent electrodes 1148b-A1, 1148b-A2, 1150b-A1, and 1150b-A2 are electrodes constituting a comb electrode which is the bias electrode 1152a).

In addition, in the bias electrode 1152a, the central electrodes 1150a-C and 1148a-C respectively form curves along the portions of the parallel waveguides 138a and 140a which are formed in a curved pattern toward a light joining portion 1190a, and the adjacent electrodes 1148a-A1 and A2 and 1150a-A1 and A2 are respectively formed in a curved pattern parallel to the central electrodes 1150a-C and 1148a-C. Similarly, in the bias electrode 1152b, the central electrodes 1150b-C and 1148b-C respectively form curves along the portions of the parallel waveguides 138b and 140b which are formed in a curved pattern toward a light joining portion 1190b, and the adjacent electrodes 1148b-A1 and A2 and 1150b-A1 and A2 are respectively formed in a curved pattern parallel to the central electrodes 1150b-C and 1148b-C.

Therefore, surface acoustic waves that are generated from the bias electrode 1152a (or 1152b) do not propagate in a single direction but dissipate, and thus the intensities of the surface acoustic waves reaching other bias electrodes (for example, the bias electrode 1152b (or 1152a)) is reduced. As a result, interference from the bias electrode 1152a (or 1152b) to other bias electrodes (for example, the bias electrode 1152b (or 1152a)) through surface acoustic waves is prevented.

Meanwhile, in the present modification example, the bias electrodes 1152a and 1152b are respectively formed along the non-linear shapes of the optical waveguides, but the constitution is not limited thereto, and, as long as electrodes are constituted along the non-linear shapes of optical waveguides like the bias electrode 1152a or 1152b in at least one bias electrode (for example, even when other bias electrodes are linearly formed along the linear shapes of optical waveguides), interference from the bias electrode to other bias electrodes through surface acoustic waves can be prevented. In addition, as long as electrodes constituting one bias electrode are constituted non-linearly along the longitudinal direction in at least a part thereof, an effect of dissipating surface acoustic waves in the part is generated, and thus the same effect as described above can be obtained.

[Tenth Modification Example]

Next, a tenth modification example of the bias electrodes 152a and 152b that are used in the optical modulator 100 illustrated in FIG. 1 will be described.

In the present modification example, one of two bias electrodes is disposed shifted from a position at which the bias electrode faces the other bias electrode in the longitudinal direction of electrodes constituting any one of the two bias electrodes, whereby the proportion of surface acoustic waves reaching the other bias electrode in all of the surface acoustic waves generated in the bias electrode is reduced, and interference from the bias electrode to other bias electrodes is prevented.

Figure 12:
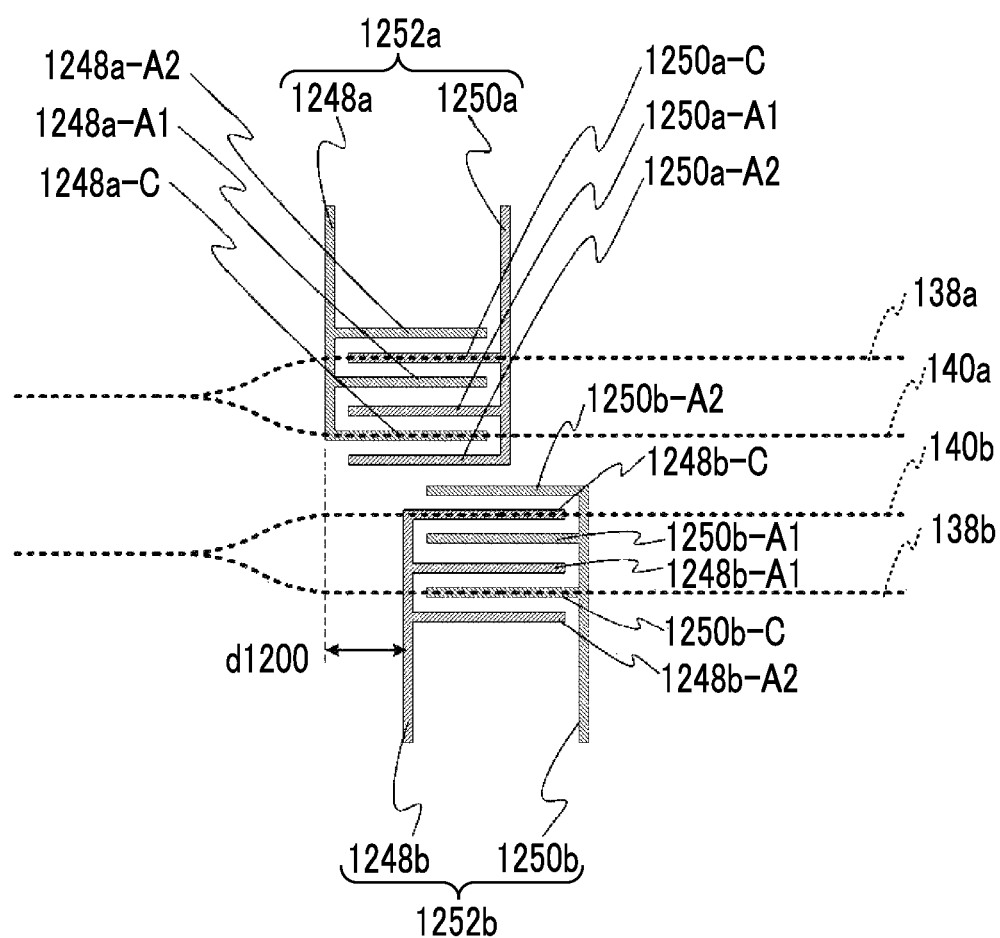
FIG. 12 is a view illustrating a tenth modification example of the bias electrode that can be used in the optical modulator illustrated in FIG. 1.

FIG. 12 is a view illustrating the constitution of bias electrodes 1252a and 1252b according to the present modification example which can be used instead of the bias electrodes 152a and 152b.

The bias electrode 1252a includes a central electrode 1250a-C which extends from an electrode 1250a and is formed on the optical waveguide 138a and a central electrode 1248*a*-C which extends from an electrode 1248*a* and is formed on the optical waveguide 140*a*. In addition, the bias electrode 1252*a* includes adjacent electrodes 1248*a*-A1 and A2 which sandwich the central electrode 1250*a*-C in the vertical direction in the drawing, run parallel to each other, and extend from the electrode 1248*a* and adjacent electrodes 1250*a*-A1 and A2 which sandwich the central electrode 1248*a*-C in the vertical direction in the drawing, run parallel to each other, and extend from the electrode 1250*a*.

Similarly, the bias electrode 1252*b* includes a central electrode 1250*b*-C which extends from an electrode 1250*b* and is formed on the optical waveguide 138*b* and a central electrode 1248*b*-C which extends from an electrode 1248*b* and is formed on the optical waveguide 140*b*. In addition, the bias electrode 1252*b* includes adjacent electrodes 1248*b*-A1 and A2 which sandwich the central electrode 1250*b*-C in the vertical direction in the drawing, run parallel to each other, and extend from the electrode 1248*b* and adjacent electrodes 1250*b*-A1 and A2 which sandwich the central electrode 1248*b*-C in the vertical direction in the drawing, run parallel to each other, and extend from the electrode 1250*b*.

Particularly, in the present modification example, the bias electrode 1252*b* is disposed a predetermined distance d1200 shifted from a position at which the bias electrode faces the bias electrode 1252*a* in the longitudinal direction of electrodes (for example, the central electrode 1248*b*-C) constituting the bias electrode 1252*b*.

Therefore, the proportion of surface acoustic waves reaching the other bias electrode 1252*b* (or 1252*a*) in all of the surface acoustic waves generated in the bias electrode 1252*a* (or 1252*b*) is reduced, and interference from the bias electrode 1252*a* (or 1252*b*) to the other bias electrode 1252*b* (1252*a*) is prevented.

Meanwhile, in the present modification example, the bias electrodes 1252*a* and 1252*b* are disposed the predetermined distance shifted from the position at which the bias electrodes face each other, but the constitution is not limited to those of the bias electrodes 1252*a* and 1252*b*, and at least two arbitrary bias electrodes (for example, one bias electrode and one of other bias electrodes present in a predetermined distance range from the bias electrode) out of a plurality of the bias electrodes in the optical modulator 100 may be disposed a predetermined distance shifted from a position at which the bias electrodes face each other.

[Eleventh Modification Example]

Next, an eleventh modification example of the bias electrodes 152*a* and 152*b* that are used in the optical modulator 100 illustrated in FIG. 1 will be described.

In the present modification example, similar to the tenth modification example, one of two bias electrodes is disposed shifted from a position at which the bias electrodes face the other bias electrode in the longitudinal direction of electrodes constituting any one of the two bias electrodes, whereby the proportion of surface acoustic waves reaching the other bias electrode in all of the surface acoustic waves generated in the bias electrode is reduced, and interference from the bias electrode to the other bias electrode is prevented.

Here, in the tenth modification example, the two bias electrodes 1252*a* and 1252*b* are disposed so as to face each other in some part; however, in the present modification example, one of two bias electrodes is disposed a predetermined distance shifted from the other bias electrode in the longitudinal direction of electrodes constituting any one of the two bias electrodes so that the two bias electrodes do not face each other in any parts. Therefore, in the present modification example, compared with the tenth modification example, interference between the two bias electrodes can be further prevented.

Figure 13:
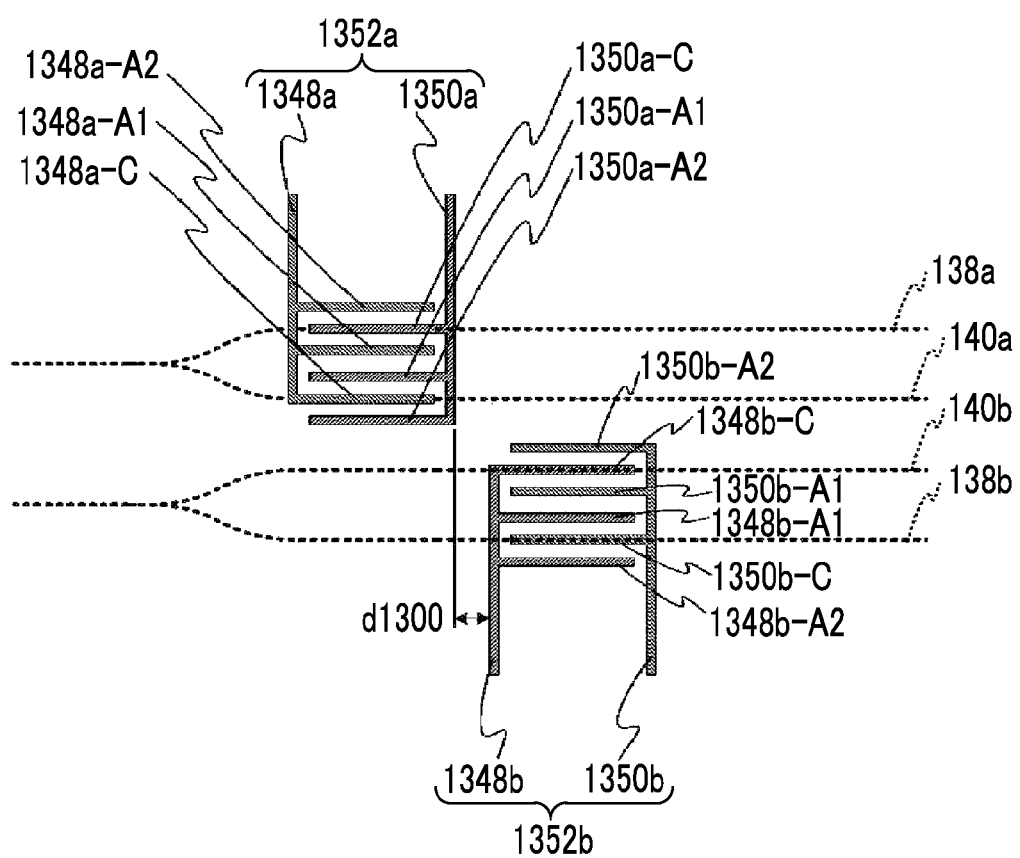
FIG. 13 is a view illustrating an eleventh modification example of the bias electrode that can be used in the optical modulator illustrated in FIG. 1.

FIG. 13 is a view illustrating the constitution of bias electrodes 1352*a* and 1352*b* according to the present modification example which can be used instead of the bias electrodes 152*a* and 152*b*.

The bias electrode 1352*a* includes a central electrode 1350*a*-C which extends from an electrode 1350*a* and is formed on the optical waveguide 138*a* and a central electrode 1348*a*-C which extends from an electrode 1348*a* and is formed on the optical waveguide 140*a*. In addition, the bias electrode 1352*a* includes adjacent electrodes 1348*a*-A1 and A2 which sandwich the central electrode 1350*a*-C in the vertical direction in the drawing, run parallel to each other, and extend from the electrode 1348*a* and adjacent electrodes 1350*a*-A1 and A2 which sandwich the central electrode 1348*a*-C in the vertical direction in the drawing, run parallel to each other, and extend from the electrode 1350*a*.

The bias electrode 1352*b*, similar to the bias electrode 1352*a*, includes a central electrode 1350*b*-C which extends from an electrode 1350*b* and is formed on the optical waveguide 138*b* and a central electrode 1348*b*-C which extends from an electrode 1348*b* and is formed on the optical waveguide 140*b*. In addition, the bias electrode 1352*b* includes adjacent electrodes 1348*b*-A1 and A2 which sandwich the central electrode 1350*b*-C in the vertical direction in the drawing, run parallel to each other, and extend from the electrode 1348*b* and adjacent electrodes 1350*b*-A1 and A2 which sandwich the central electrode 1348*b*-C in the vertical direction in the drawing, run parallel to each other, and extend from the electrode 1350*b*.

Particularly, in the present modification example, the bias electrode 1352*b* is disposed at a position at which the bias electrode does not face the bias electrode 1352*a* in any parts shifted from a position at which the bias electrode faces the bias electrode 1352*a* in the longitudinal direction of electrodes (for example, the central electrode 1348*b*-C) constituting the bias electrode 1352*b*.

The position of the bias electrode 1352*b* at which the bias electrode does not face the bias electrode 1352*a* in any parts can be set to, for example, a position at which the distance between the edge of the bias electrode 1352*a* on the bias electrode 1352*b* side and the edge of the bias electrode 1352*b* on the bias electrode 1352*a* side reaches a predetermined distance d1300 or longer as illustrated in FIG. 13.

Therefore, out of surface acoustic waves generated from one bias electrode (1352*a* or 1352*b*), only a small number of surface acoustic waves that dissipate and propagate in the horizontal direction in the drawing reaches the other bias electrode (1352*b* or 1352*a*), and thus interference from the bias electrode (1352*a* or 1352*b*) to the other bias electrodes ((1352*b* or 1352*a*) can be prevented.

Meanwhile, in the present modification example, the bias electrodes 1352*a* and 1352*b* are disposed shifted from a position at which the bias electrodes face each other, but the constitution is not limited to those of the bias electrodes 1352*a* and 1352*b*, and at least two arbitrary bias electrodes (for example, one bias electrode and one of other bias electrodes present in a predetermined distance range from the bias electrode) out of a variety of the bias electrodes in the optical modulator 100 may be disposed shifted from a position at which the bias electrodes face each other.

<Second Embodiment>

Figure 14:
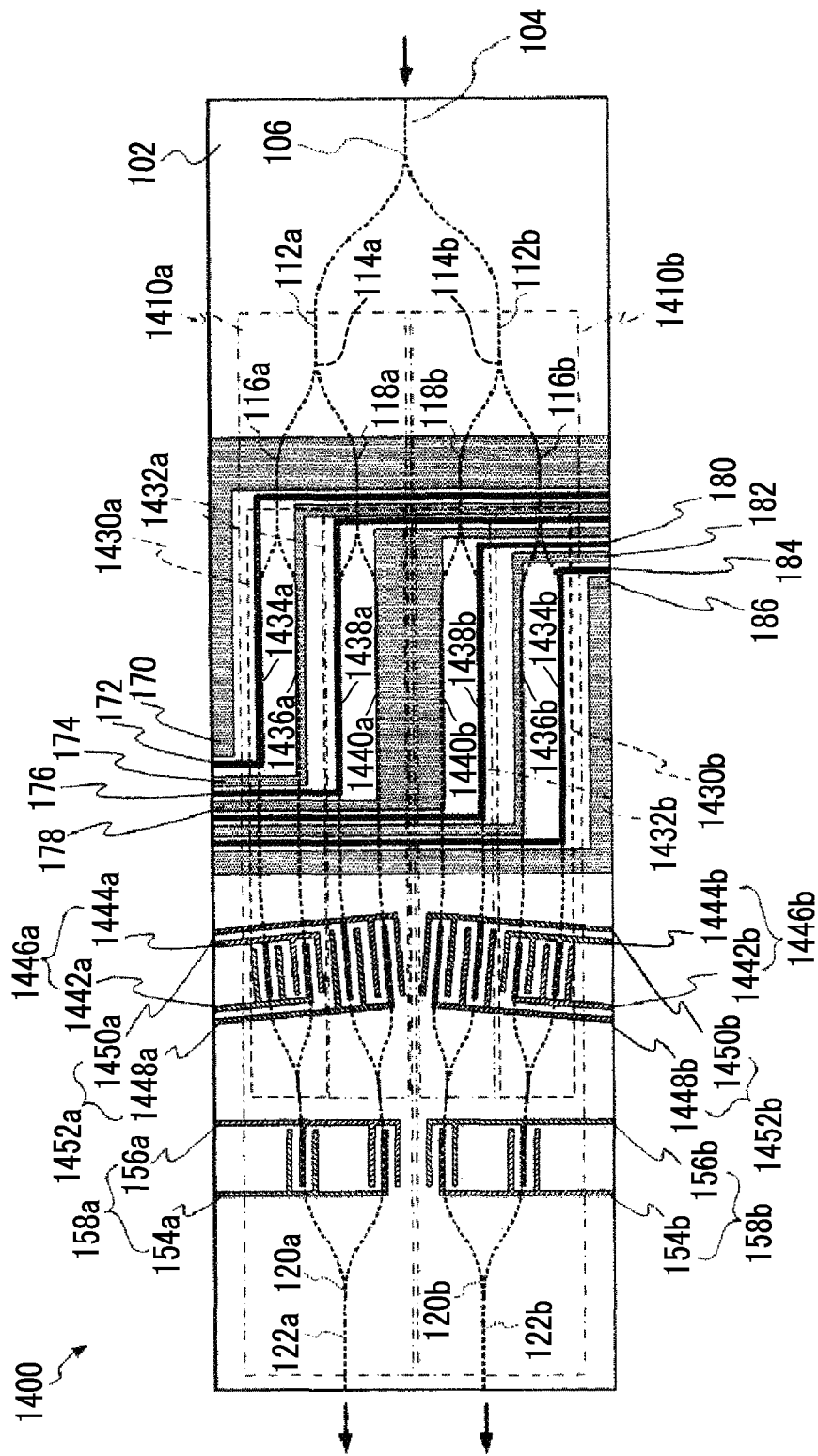
FIG. 14 is a view illustrating the constitution of an optical modulator according to a second embodiment of the present invention.

Next, a second embodiment of the present invention will be described. FIG. 14 is a view illustrating the constitution of an optical modulator according to the second embodiment of the present invention. In FIG. 14, the same constituent elements as those in the optical modulator 100 according to the first embodiment, which is illustrated in FIG. 1, will be given the same reference sign as the reference sign in FIG. 1, and the above-described description of the first embodiment is incorporated herein by reference.

An optical modulator 1400 according to the present embodiment, which is illustrated in FIG. 14, includes Mach-Zehnder type optical waveguides 1410a and 1410b instead of the Mach-Zehnder type optical waveguides 110a and 110b illustrated in FIG. 1.

The Mach-Zehnder type optical waveguide 1410a has the same constitution as that of the Mach-Zehnder type optical waveguide 110a illustrated in FIG. 1 except for having parallel waveguides (or serial waveguides) 1434a, 1436a, 1438a, and 1440a which guide light propagating from the right to the left in the drawing in the downward direction in the drawing in the left portion of the drawing instead of the parallel waveguides 134a to 140a.

In addition, the Mach-Zehnder type optical waveguide 1410b has the same constitution as that of the Mach-Zehnder type optical waveguide 110b illustrated in FIG. 1 except for having parallel waveguides (or serial waveguides) 1434b, 1436b, 1438b, and 1440b which guide light propagating from the right to the left in the drawing in the upward direction in the drawing in the left portion of the drawing instead of the parallel waveguides 134b to 140b.

In addition, the optical modulator 1400 includes bias electrodes 1446a, 1452a, 1446b, and 1452b instead of the bias electrodes 146a, 152a, 146b, and 152b illustrated in FIG. 1. The bias electrode 1446a is formed of electrodes 1442a and 1444a, and the bias electrode 1446b is formed of electrodes 1442b and 1444b. In addition, the bias electrode 1452a is formed of electrodes 1448a and 1450a, and the bias electrode 1452b is formed of electrodes 1448b and 1450b.

Figure 15:
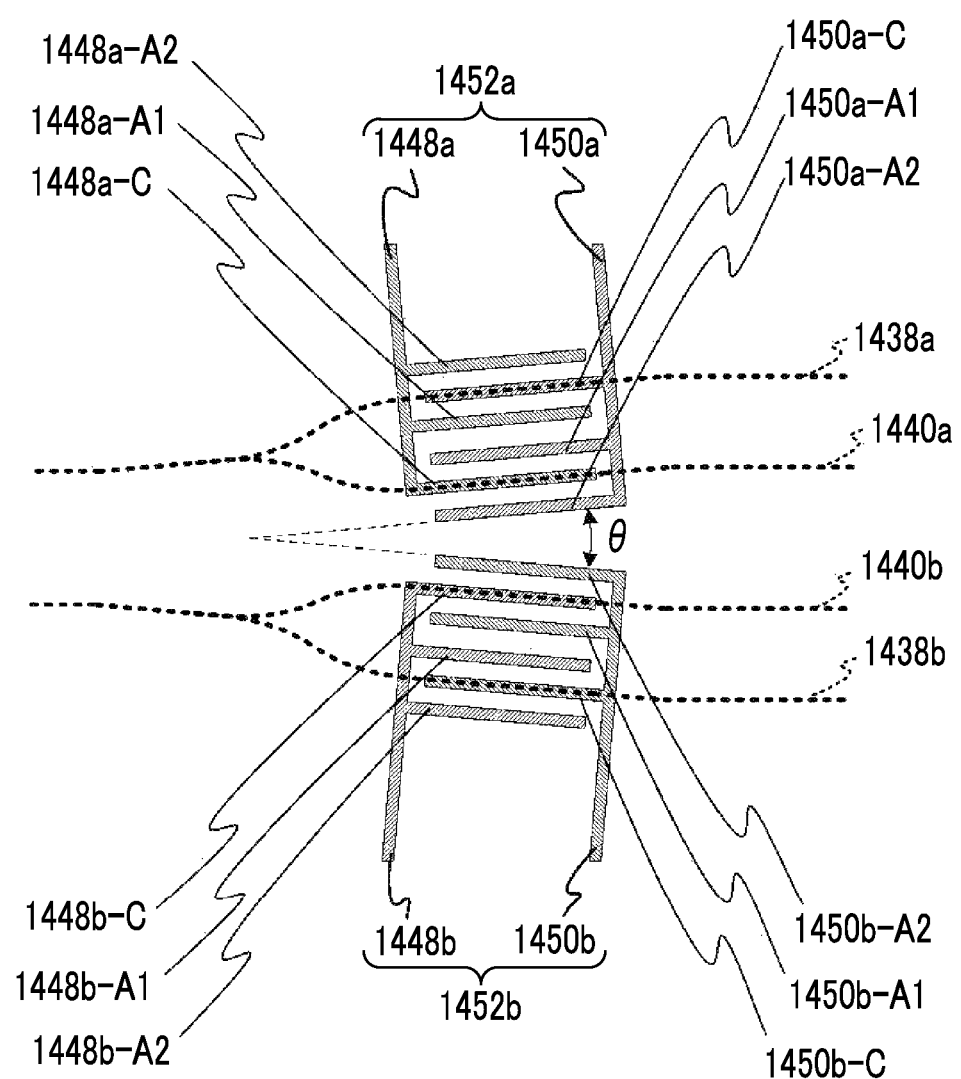
FIG. 15 is a partial detail view of a vicinity of a bias electrode in the optical modulator illustrated in FIG. 14.

FIG. 15 is a partial detail view of the bias electrodes 1452a and 1452b and vicinities thereof in the optical modulator 1400 illustrated in FIG. 14.

The bias electrode 1452a includes a central electrode 1450a-C which extends from the electrode 1450a and is formed on an optical waveguide 1438a and a central electrode 1448a-C which extends from an electrode 1448a and is formed on the optical waveguide 1440a. In addition, the bias electrode 1452a includes adjacent electrodes 1448a-A1 and A2 which sandwich the central electrode 1450a-C in the vertical direction in the drawing, run parallel to each other, and extend from the electrode 1448a and adjacent electrodes 1450a-A1 and A2 which sandwich the central electrode 1448a-C in the vertical direction in the drawing, run parallel to each other, and extend from the electrode 1450a (that is, the central electrodes 1450a-C and 1448a-C and the adjacent electrodes 1448a-A1, 1448a-A2, 1450a-A1, and 1450a-A2 are electrodes constituting a comb electrode which is the bias electrode 1452a).

Similarly, the bias electrode 1452b includes a central electrode 1450b-C which extends from the electrode 1450b and is formed on an optical waveguide 1438b and a central electrode 1448b-C which extends from an electrode 1448b and is formed on the optical waveguide 1440b. In addition, the bias electrode 1452b includes adjacent electrodes 1448b-A1 and A2 which sandwich the central electrode 1450b-C in the vertical direction in the drawing, run parallel to each other, and extend from the electrode 1448b and adjacent electrodes 1450b-A1 and A2 which sandwich the central electrode 1448b-C in the vertical direction in the drawing, run parallel to each other, and extend from the electrode 1450b (that is, the central electrodes 1450b-C and 1448b-C and the adjacent electrodes 1448b-A1, 1448b-A2, 1450b-A1, and 1450b-A2 are electrodes constituting a comb electrode which is the bias electrode 1452b).

In addition, the bias electrodes 1452a and 1452b are disposed so that the longitudinal direction of electrodes constituting the bias electrode 1452a (for example, the adjacent electrode 1450a-A2) and the longitudinal direction of electrodes constituting the bias electrode 1452b (for example, the adjacent electrode 1450b-A2) form a predetermined angle θ.

A surface acoustic wave that is generated from the bias electrode 1452a mainly propagates in a direction perpendicular to the longitudinal direction of the electrodes constituting the bias electrode 1452b, and thus the wavelength λ' of the surface acoustic wave seen from the bias electrode 1452b that is inclined at an angle θ with respect to the bias electrode 1452a appears to be longer than the actual wavelength λ (more specifically, $\lambda' = \lambda/\sin\theta$). Therefore, for example, even when the characteristic frequencies of the bias electrodes 1452a and 1452b are both $f_0$-13, surface acoustic waves excited at a frequency $f_0$-13 from the bias electrode 1452a act as surface acoustic waves having a shorter frequency (more specifically, $f_0$-13×sin θ) which is different from the characteristic frequency $f_0$-13 with respect to the bias electrode 1452b, and thus interference of the surface acoustic waves on the bias electrode 1452b is prevented.

This phenomenon also applies to interference of surface acoustic waves generated from the bias electrode 1452b on the bias electrode 1452a. Therefore, even when the bias electrodes 1452a and 1452b have the same characteristic frequency, interference between the bias electrodes 1452a and 1452b is prevented by means of the above-described constitution.

Meanwhile, in the present embodiment, the bias electrodes 1452a and 1452b are disposed so as to form an angle θ together, but the constitution is not limited to those of the bias electrodes 1452a and 1452b, and at least two arbitrary bias electrodes (for example, one bias electrode and one of other bias electrodes present in a predetermined distance range from the bias electrode) out of a variety of the bias electrodes in the optical modulator 1400 may be disposed so as to form an angle θ together.

<Third Embodiment>

Figure 16:
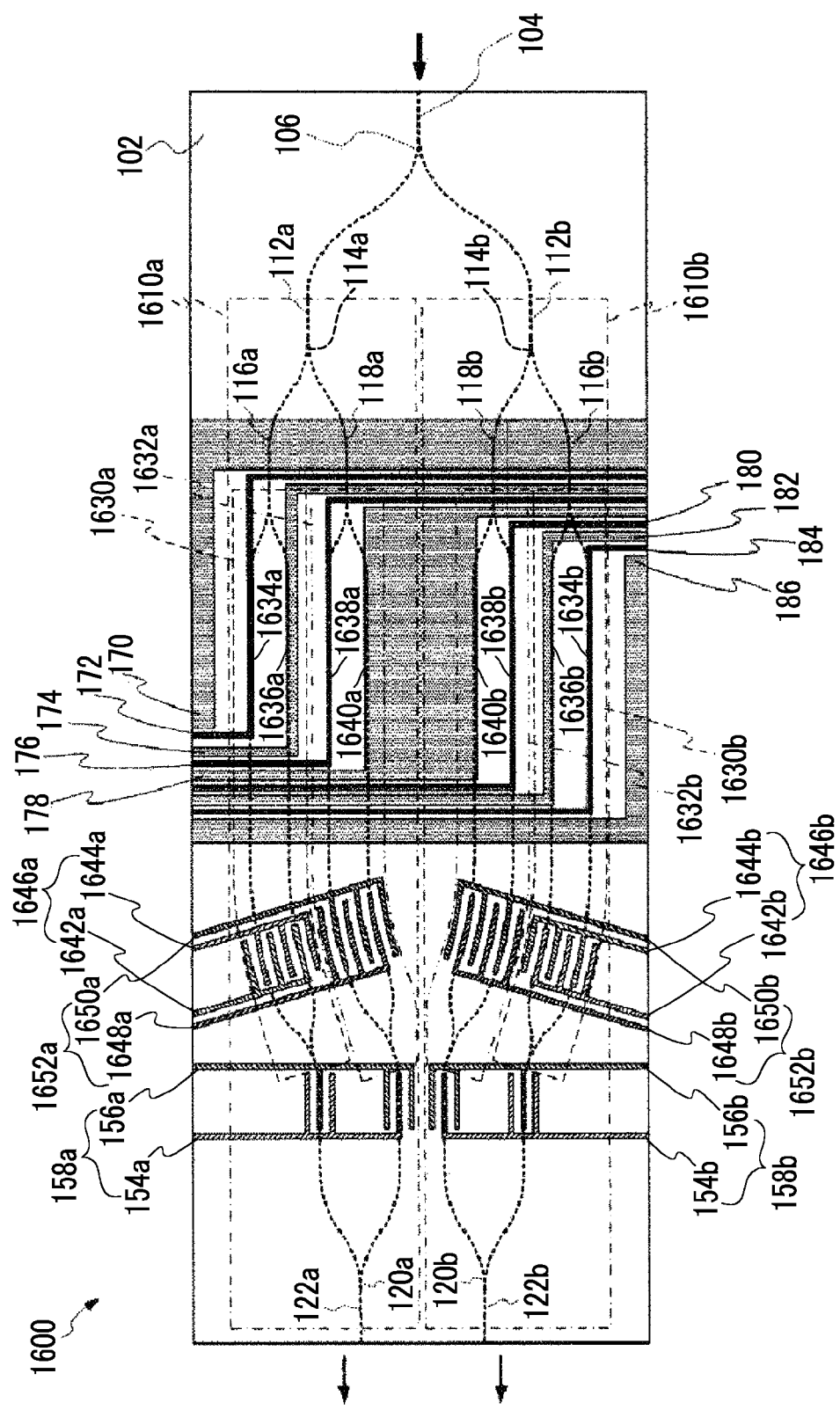
FIG. 16 is a view illustrating the constitution of an optical modulator according to a third embodiment of the present invention.

Next, a third embodiment of the present invention will be described. FIG. 16 is a view illustrating the constitution of an optical modulator according to the third embodiment of the present invention. In FIG. 16, the same constituent elements as those in the optical modulator 100 according to the first modification example, which is illustrated in FIG. 1, will be given the same reference sign as the reference sign in FIG. 1, and the above-described description of the first embodiment is incorporated herein by reference.

An optical modulator 1600 according to the present embodiment, which is illustrated in FIG. 16, includes Mach-Zehnder type optical waveguides 1610a and 1610b instead of the Mach-Zehnder type optical waveguides 110a and 110b illustrated in FIG. 1.

The Mach-Zehnder type optical waveguide 1610a has the same constitution as that of the Mach-Zehnder type optical waveguide 110a illustrated in FIG. 1 except for having parallel waveguides (or serial waveguides) 1634a, 1636a, 1638a, and 1640a in which light propagating from the right to the left in the drawing curves along a line that curves in the downward direction in the drawing in the left portion of the drawing instead of the parallel waveguides 134a to 140a.

In addition, the Mach-Zehnder type optical waveguide 1610*b* has the same constitution as that of the Mach-Zehnder type optical waveguide 110*b* illustrated in FIG. 1 except for having parallel waveguides 1634*b*, 1636*b*, 1638*b*, and 1640*b* in which light propagating from the right to the left in the drawing curves along a line that curves in the upward direction in the drawing in the left portion of the drawing instead of the parallel waveguides 134*b* to 140*b*.

In addition, the optical modulator 1600 includes bias electrodes 1646*a*, 1652*a*, 1646*b*, and 1652*b* instead of the bias electrodes 146*a*, 152*a*, 146*b*, and 152*b* illustrated in FIG. 1. The bias electrode 1646*a* is formed of electrodes 1642*a* and 1644*a*, and the bias electrode 1646*b* is formed of electrodes 1642*b* and 1644*b*. In addition, the bias electrode 1652*a* is formed of electrodes 1648*a* and 1650*a*, and the bias electrode 1652*b* is formed of electrodes 1648*b* and 1650*b*.

Figure 17:
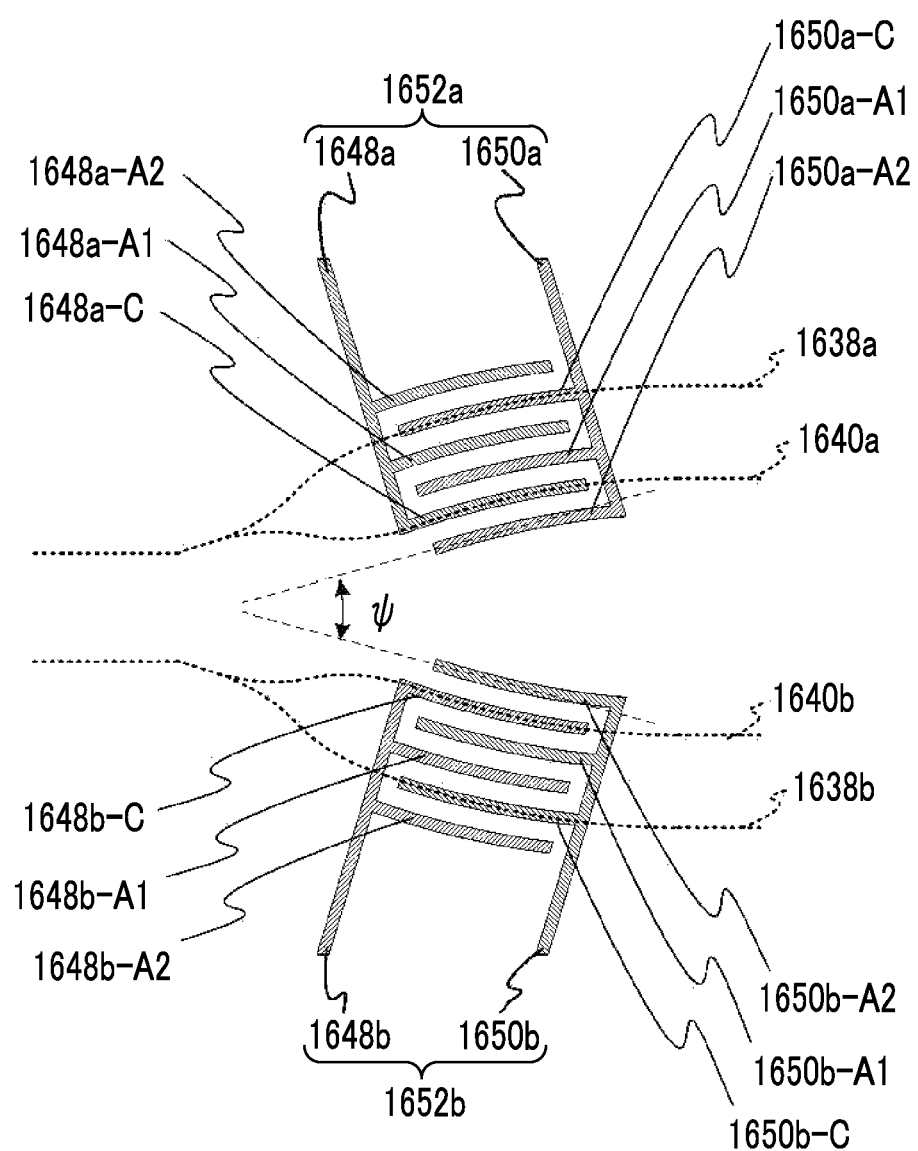
FIG. 17 is a partial detail view of a vicinity of a bias electrode in the optical modulator illustrated in FIG. 16.

FIG. 17 is a partial detail view of the bias electrodes 1652*a* and 1652*b* and vicinities thereof in the optical modulator 1600 illustrated in FIG. 16.

The bias electrode 1652*a* includes a central electrode 1650*a*-C which extends from the electrode 1650*a* and is formed on an optical waveguide 1638*a* and a central electrode 1648*a*-C which extends from an electrode 1648*a* and is formed on the optical waveguide 1640*a*. In addition, the bias electrode 1652*a* includes adjacent electrodes 1648*a*-A1 and A2 which sandwich the central electrode 1650*a*-C in the vertical direction in the drawing, run parallel to each other, and extend from the electrode 1648*a* and adjacent electrodes 1650*a*-A1 and A2 which sandwich the central electrode 1648*a*-C in the vertical direction in the drawing, run parallel to each other, and extend from the electrode 1650*a* (that is, the central electrodes 1650*a*-C and 1648*a*-C and the adjacent electrodes 1648*a*-A1, 1648*a*-A2, 1650*a*-A1, and 1650*a*-A2 are electrodes constituting a comb electrode which is the bias electrode 1652*a*).

Similarly, the bias electrode 1652*b* includes a central electrode 1650*b*-C which extends from the electrode 1650*b* and is formed on an optical waveguide 1638*b* and a central electrode 1648*b*-C which extends from an electrode 1648*b* and is formed on the optical waveguide 1640*b*. In addition, the bias electrode 1652*b* includes adjacent electrodes 1648*b*-A1 and A2 which sandwich the central electrode 1650*b*-C in the vertical direction in the drawing, run parallel to each other, and extend from the electrode 1648*b* and adjacent electrodes 1650*b*-A1 and A2 which sandwich the central electrode 1648*b*-C in the vertical direction in the drawing, run parallel to each other, and extend from the electrode 1650*b* (that is, the central electrodes 1650*b*-C and 1648*b*-C and the adjacent electrodes 1648*b*-A1, 1648*b*-A2, 1650*b*-A1, and 1650*b*-A2 are electrodes constituting a comb electrode which is the bias electrode 1652*b*).

In addition, in the bias electrode 1652*a*, the central electrodes 1650*a*-C and 1648*a*-C form curved lines along the optical waveguides 1638*a* and 1640*a* that respectively bend in the downward direction in the drawing, and the adjacent electrodes 1648*a*-A1 and A2 and 1650*a*-A1 and A2 are respectively formed along the curved lines of the central electrodes 1650*a*-C and 1648*a*-C. Similarly, in the bias electrode 1652*b*, the central electrodes 1650*b*-C and 1648*b*-C form curved lines along the optical waveguides 1638*b* and 1640*b* that respectively bend in the downward direction in the drawing, and the adjacent electrodes 1648*b*-A1 and A2 and 1650*b*-A1 and A2 are respectively formed along the curved lines of the central electrodes 1650*b*-C and 1648*b*-C.

In addition, the bias electrodes 1652*a* and 1652*b* are disposed so that the longitudinal direction of the electrodes constituting the bias electrode 1652*a* and the longitudinal direction of the electrodes constituting the bias electrode 1652*b* form a predetermined angle $\psi$. Here, in a case in which electrodes such as those constituting the bias electrodes 1652*a* and 1652*b* form curved lines, "the longitudinal direction of the electrode" can be, for example, a direction obtained by averaging the tangential directions of the electrodes constituting the bias electrode, the tangential direction at the central point of the electrode in the longitudinal direction (or a direction obtained by averaging the tangential directions thereof), or the like.

Therefore, similar to the optical modulator 1400 according to the second embodiment, even when the characteristic frequencies of the bias electrodes 1652*a* and 1652*b* are both $f_0-15$, surface acoustic waves excited at a frequency $f_0-15$ from the bias electrode 1652*a* (or 1652*b*) act as surface acoustic waves having a shorter frequency which is different from the characteristic frequency $f_0-15$ with respect to the bias electrode 1652*b* (or 1652*a*), and thus interference of the surface acoustic waves on the bias electrode 1652*b* (or 1652*a*) is prevented. As a result, interference between the bias electrodes 1652*a* and 1652*b* is prevented.

Meanwhile, in the present embodiment, the bias electrodes 1652*a* and 1652*b* are disposed so as to form an angle $\psi$ together and are formed in a curved pattern along the corresponding optical waveguides, but the constitution is not limited to those of the bias electrodes 1652*a* and 1652*b*, and at least two arbitrary bias electrodes (for example, one bias electrode and one of other bias electrodes present in a predetermined distance range from the bias electrode) out of a variety of the bias electrodes in the optical modulator 1600 may be disposed so as to form an angle $\psi$ therebetween and form a curved pattern along the corresponding optical waveguides.

<Fourth Embodiment>

Figure 18:
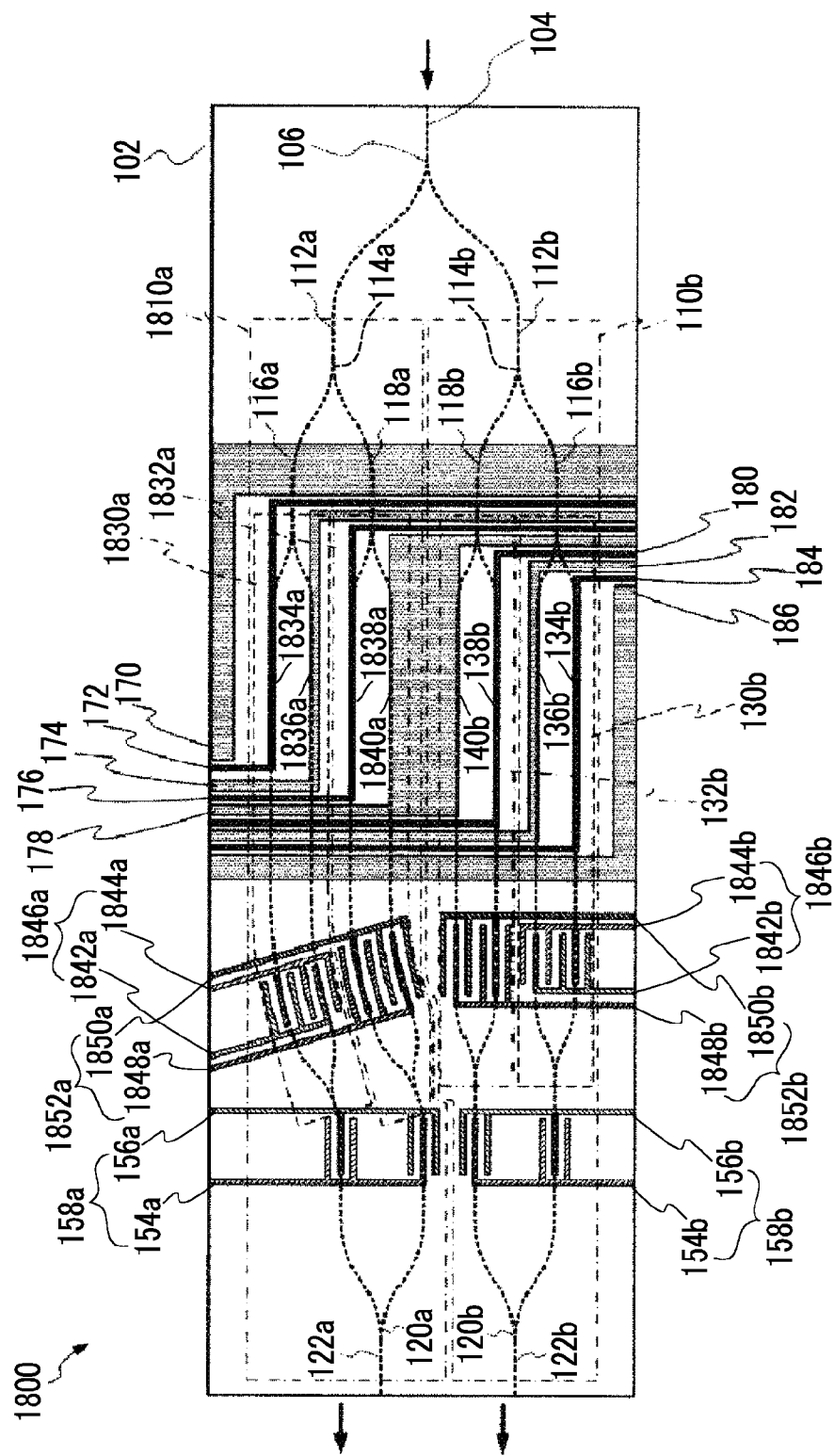
FIG. 18 is a view illustrating the constitution of an optical modulator according to a fourth embodiment of the present invention.

Next, a fourth embodiment of the present invention will be described. FIG. 18 is a view illustrating the constitution of an optical modulator according to the fourth embodiment of the present invention. In FIG. 18, the same constituent elements as those in the optical modulator 100 according to the first embodiment, which is illustrated in FIG. 1, will be given the same reference sign as the reference sign in FIG. 1, and the above-described description of the first embodiment is incorporated herein by reference.

An optical modulator 1800 according to the present embodiment, which is illustrated in FIG. 18, includes a Mach-Zehnder type optical waveguide 1810*a* instead of the Mach-Zehnder type optical waveguide 110*a* illustrated in FIG. 1.

The Mach-Zehnder type optical waveguide 1810*a* has the same constitution as that of the Mach-Zehnder type optical waveguide 110*a* illustrated in FIG. 1 except for having parallel waveguides 1834*a*, 1836*a*, 1838*a*, and 1840*a* in which light propagating from the right to the left in the drawing curves along a line that curves in the downward direction in the drawing in the left portion of the drawing instead of the parallel waveguides 134*a* to 140*a*.

In addition, the optical modulator 1800 includes bias electrodes 1846*a*, 1852*a*, 1846*b*, and 1852*b* instead of the bias electrodes 146*a*, 152*a*, 146*b*, and 152*b* illustrated in FIG. 1. The bias electrode 1846*a* is formed of electrodes 1842*a* and 1844*a*, and the bias electrode 1846*b* is formed of electrodes 1842*b* and 1844*b*. In addition, the bias electrode 1852*a* is formed of electrodes 1848*a* and 1850*a*, and the bias electrode 1852*b* is formed of electrodes 1848*b* and 1850*b*.

Figure 19:
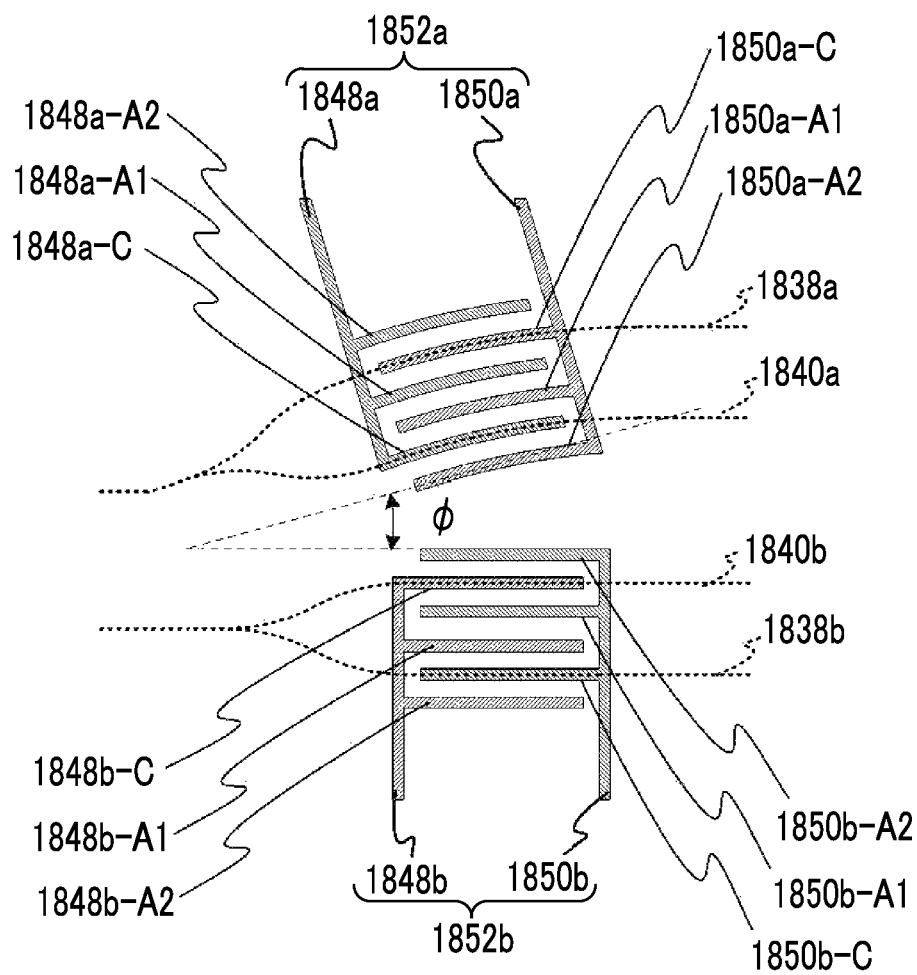
FIG. 19 is a partial detail view of a vicinity of a bias electrode in the optical modulator illustrated in FIG. 18.

FIG. 19 is a partial detail view of the bias electrodes 1852a and 1852b and vicinities thereof in the optical modulator 1800 illustrated in FIG. 18.

The bias electrode 1852a includes a central electrode 1850a-C which extends from the electrode 1850a and is formed on an optical waveguide 1838a and a central electrode 1848a-C which extends from the electrode 1848a and is formed on the optical waveguide 1840a. In addition, the bias electrode 1852a includes adjacent electrodes 1848a-A1 and A2 which sandwich the central electrode 1850a-C in the vertical direction in the drawing, run parallel to each other, and extend from the electrode 1848a and adjacent electrodes 1850a-A1 and A2 which sandwich the central electrode 1848a-C in the vertical direction in the drawing, run parallel to each other, and extend from the electrode 1850a (that is, the central electrodes 1850a-C and 1848a-C and the adjacent electrodes 1848a-A1, 1848a-A2, 1850a-A1, and 1850a-A2 are electrodes constituting a comb electrode which is the bias electrode 1852a).

The bias electrode 1852b, similar to the bias electrode 1852a, includes a central electrode 1850b-C which extends from the electrode 1850b and is formed on an optical waveguide 1838b and a central electrode 1848b-C which extends from the electrode 1848b and is formed on the optical waveguide 1840b. In addition, the bias electrode 1852b includes adjacent electrodes 1848b-A1 and A2 which sandwich the central electrode 1850b-C in the vertical direction in the drawing, run parallel to each other, and extend from the electrode 1848b and adjacent electrodes 1850b-A1 and A2 which sandwich the central electrode 1848b-C in the vertical direction in the drawing, run parallel to each other, and extend from the electrode 1850b (that is, the central electrodes 1850b-C and 1848b-C and the adjacent electrodes 1848b-A1, 1848b-A2, 1850b-A1, and 1850b-A2 are electrodes constituting a comb electrode which is the bias electrode 1852a).

In addition, in the bias electrode 1852a, the central electrodes 1850a-C and 1848a-C form curved lines along the optical waveguides 1838a and 1840a that respectively bend in the downward direction in the drawing, and the adjacent electrodes 1848a-A1 and A2 and 1850a-A1 and A2 are respectively formed along the curved lines of the central electrodes 1850a-C and 1848a-C. Meanwhile, in the bias electrode 1852b, the central electrodes 1850b-C and 1848b-C are respectively formed linearly along the optical waveguides 1838b and 1840b, and the adjacent electrodes 1848b-A1 and A2 and 1850b-A1 and A2 are respectively formed linearly along the central electrodes 1850b-C and 1848b-C.

In addition, the bias electrodes 1852a and 1852b are disposed so that the longitudinal direction of the electrodes constituting the bias electrode 1852a and the longitudinal direction of the electrodes constituting the bias electrode 1852b form a predetermined angle $^{SM}$. Here, in a case in which electrodes such as those constituting the bias electrode 1172a form a curved line, "the longitudinal direction of the electrode" can be, for example, a direction obtained by averaging the tangential directions of the electrodes constituting the bias electrode 1172a, the tangential direction at the central point of the electrode in the longitudinal direction (or a direction obtained by averaging the tangential directions thereof), or the like.

Due to the above-described constitution, in the present embodiment, similar to the optical modulator 1400 according to the second embodiment, even when the characteristic frequencies of the bias electrodes 1852a and 1852b are both $f_0$–17, surface acoustic waves excited at a frequency $f_0$–17 from the bias electrode 1852a (or 1852b) act as surface acoustic waves having a shorter frequency which is different from the characteristic frequency $f_0$–17 with respect to the bias electrode 1852b (or 1852a), and thus interference of the surface acoustic waves on the bias electrode 1852b (or 1852a) is prevented. As a result, interference between the bias electrodes 1852a and 1852b is prevented.

<Fifth Embodiment>

Next, a fifth embodiment of the present invention will be described. The present embodiment is an optical transmission device equipped with any one of the optical modulators 100 (including arbitrary modification examples illustrated in FIGS. 3 to 13), 1400, 1600, and 1800 described in the first to fourth embodiments.

Figure 20:
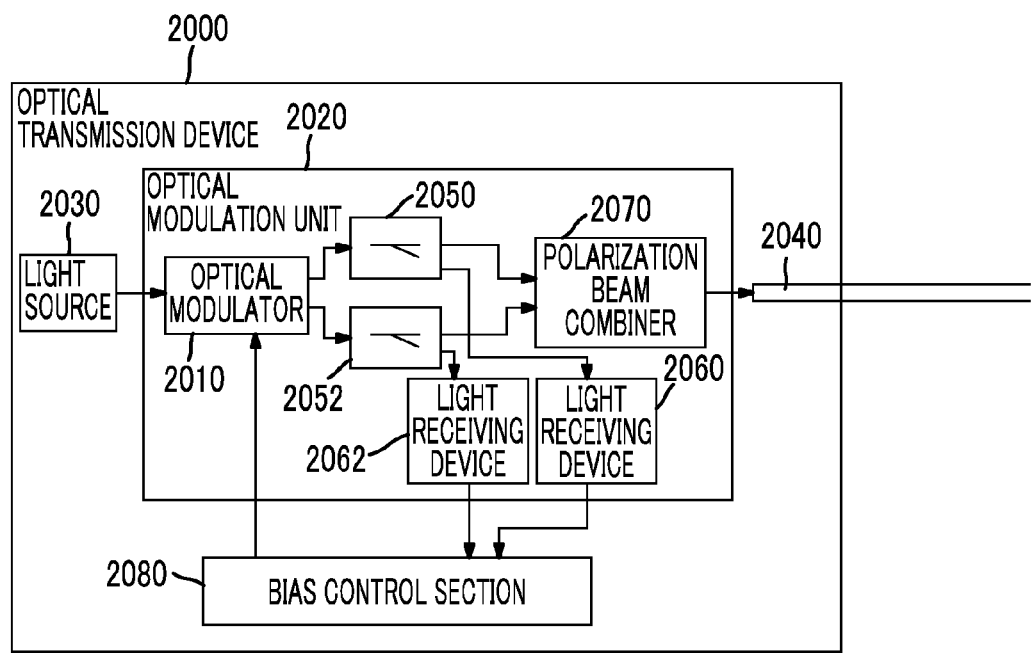
FIG. 20 is a view illustrating the constitution of an optical transmission device according to a fifth embodiment of the present invention.

FIG. 20 is a view illustrating the constitution of the optical transmission device according to the present embodiment. The present optical transmission device 2000 includes an optical modulation unit 2020 including an optical modulator 2010, a light source 2030 from which light is incident on the optical modulator 2010, and an optical fiber 2040 that transmits light output from the optical modulation unit 2020.

The optical modulation unit 2020 also includes light branching devices 2050 and 2052 that respectively branch some of two orthogonal polarized light rays that are output from the optical modulator 2010 and light receiving devices 2060 and 2062 that respectively receive one of light rays obtained by branching the polarized light rays using the light branching devices 2050 and 2052. The output of the light receiving devices 2060 and 2062 is output to a bias control section 2080 (described below) as a feedback signal.

Furthermore, the optical modulation unit 2020 includes a polarization beam combiner 2070.

The optical modulator 2010 in the optical modulation unit 2020 is any one of the optical modulators 100 (including arbitrary modification examples illustrated in FIGS. 3 to 13), 1400, 1600, and 1800 respectively illustrated in FIGS. 1, 14, 16, and 18, and the polarization beam combiner 2070 couples two orthogonal polarized light rays which have been output from the optical modulator 2010 and respectively passed through the light branching devices 2050 and 2052 and inputs the coupled light rays to the optical fiber 2040.

The optical transmitter 2000 also includes the bias control section 2080 which is a control device that controls bias electrodes in the optical modulator 2010. The bias control section 2080 applies a bias voltage in which a dither signal for detecting the fluctuation of bias points is superimposed on a direct-current voltage for controlling bias points to the bias electrodes in the optical modulator 2010. In addition, the bias control section 2080 controls the intensity of the direct-current voltage that is applied to the bias electrodes in the optical modulator 2010 by monitoring the intensities of dither signal frequency components in feedback signals that are output from the light receiving devices 2060 and 2062 in the optical modulation unit 2020.

When the optical modulator 2010 includes a plurality of bias electrodes, the bias control section 2080 also applies the bias voltages in which dither signals having different frequencies are used for the respective bias electrodes to the respective bias electrodes.

Meanwhile, dither signals are not limited to sinusoidal waves and can be any signals having an arbitrary waveform such as sawtooth waves, pulse waves, triangle waves, or staircase waves.

As described above, the optical modulator described in the above-described embodiment includes a plurality of bias electrodes, and the bias electrodes are constituted and/or disposed such that an electrical signal applied to one of the bias electrodes (for example, the bias electrode 152a) is prevented from being received by other bias electrodes (for example, the bias electrode 152b) through a surface acoustic wave that propagates on the substrate.

Therefore, even in a case in which dither signals having different frequencies are respectively applied to a variety of the bias electrodes, the present optical modulator is capable of realizing stable bias control operation that does not depend on the selected frequencies of dither signals or the ambient temperature.

Meanwhile, in the above-described embodiment, the DP-QPSK modulator produced using a Z-cut LN substrate has been described, but the present invention is not limited thereto, and the present invention can also be widely applied to optical modulators for which a Y-cut or X-cut LN substrate is used or optical modulators formed using a substrate made of a piezoelectric material other than LN.

In addition, in the above-described embodiments, the bias electrodes are constituted in a comb electrode form, but the present invention is not limited thereto, and bias electrodes may have an arbitrary constitution as long as the bias electrodes are capable of generating surface acoustic waves on substrates having a piezoelectric effect.

What is claimed is:

1. An optical modulator comprising:
a substrate having a piezoelectric effect
an optical waveguide(s) formed on the substrate; and
a plurality of bias electrodes that control an optical wave(s) which propagate through the optical waveguide(s),
wherein each of the bias electrodes comprises at least one pair of electrodes which extend with an interval therebetween,
wherein the interval in the bias electrodes is set so as to impede a dither signal applied to one of the bias electrodes from being received by another one of the bias electrodes through a surface acoustic wave propagating on a surface of the substrate,
wherein in order to impede the dither signal applied to at least one of the bias electrodes from being received by another one of the bias electrodes through the surface acoustic wave propagating on the surface of the substrate, the interval in the at least one of the bias electrodes is set so as to suppress an electro-acoustic conversion efficiency of the at least one of the bias electrodes, the electro-acoustic conversion efficiency indicating an efficiency of converting an electrical signal applied to the bias electrode into a surface acoustic wave, and
wherein the at least one of the bias electrodes is constituted so that the interval in the at least one of the bias electrode changes stepwise along a longitudinal direction of the electrodes constituting said at least one of the bias electrodes, and thereby the at least one of the bias electrodes has a plurality of characteristic frequencies, each of which gives a maximum value of the electro-acoustic conversion efficiency.

2. An optical modulator comprising:
a substrate having a piezoelectric effect
an optical waveguide(s) formed on the substrate; and
a plurality of bias electrodes that control an optical wave(s) which propagate through the optical waveguide(s),
wherein each of the bias electrodes comprises at least one pair of electrodes which extend with an interval therebetween,
wherein the interval in the bias electrodes is set so as to impede a dither signal applied to one of the bias electrodes from being received by another one of the bias electrodes through a surface acoustic wave propagating on a surface of the substrate,
wherein in order to impede the dither signal applied to at least one of the bias electrodes from being received by another one of the bias electrodes through the surface acoustic wave propagating on the surface of the substrate, the interval in the at least one of the bias electrodes is set so as to suppress an electro-acoustic conversion efficiency of the at least one of the bias electrodes, the electro-acoustic conversion efficiency indicating an efficiency of converting an electrical signal applied to the bias electrode into a surface acoustic wave, and
wherein the at least one of the bias electrodes is constituted so that the interval in the at least one of the bias electrodes changes linearly along a longitudinal direction of the electrodes constituting said at least one of the bias electrodes, and thereby the at least one of the bias electrodes has characteristic frequencies distributed within a predetermined frequency range, the characteristic frequencies giving a maximum value of the electro-acoustic conversion efficiency.

3. An optical modulator comprising:
a substrate having a piezoelectric effect
an optical waveguide(s) formed on the substrate; and
a plurality of bias electrodes that control an optical wave(s) which propagate through the optical waveguide(s),
wherein each of the bias electrodes comprises at least one pair of electrodes which extend with an interval therebetween,
wherein the interval in the bias electrodes is set so as to impede a dither signal applied to one of the bias electrodes from being received by another one of the bias electrodes through a surface acoustic wave propagating on a surface of the substrate,
wherein in order to impede the dither signal applied to at least one of the bias electrodes from being received by another one of the bias electrodes through the surface acoustic wave propagating on the surface of the substrate, the interval in the at least one of the bias electrodes is set so as to suppress an electro-acoustic conversion efficiency of the at least one of the bias electrodes, the electro-acoustic conversion efficiency indicating an efficiency of converting an electrical signal applied to the bias electrode into a surface acoustic wave, and
wherein the at least one of the bias electrodes is constituted so that the interval in the at least one of the bias electrodes changes non-linearly along a longitudinal direction of the electrodes constituting said at least one of the bias electrodes, and thereby the at least one of the bias electrodes has characteristic frequencies distributed within a predetermined frequency range, the characteristic frequencies giving a maximum value of the electro-acoustic conversion efficiency.

4. An optical modulator comprising:
a substrate having a piezoelectric effect
an optical waveguide(s) formed on the substrate; and
a plurality of bias electrodes that control an optical wave(s) which propagate through the optical waveguide(s), wherein each of the bias electrodes comprises at least one pair of electrodes which extend with an interval therebetween, wherein the interval in the bias electrodes is set so as to impede a dither signal applied to one of the bias electrodes from being received by another one of the bias electrodes through a surface acoustic wave propagating on a surface of the substrate, and wherein in order to impede the dither signal applied to at least one of the bias electrodes from being received by another one of the bias electrodes through the surface acoustic wave propagating on the surface of the substrate, the intervals in at least two of the bias electrodes are set such that each of the at least two of the bias electrodes have a different characteristic frequency from each other.

5. The optical modulator according to claim 1,
wherein the at least one of the bias electrodes is constituted such that the interval in the at least one of the bias electrode changes stepwise along a longitudinal direction of the electrodes constituting said at least one of the bias electrodes by changing a gap(s) between the electrodes constituting the at least one of the bias electrodes stepwise.

6. The optical modulator according to claim 5,
wherein the at least one of the bias electrodes is constituted such that the interval in the at least one of the bias electrodes changes stepwise along a longitudinal direction of the electrodes constituting said at least one of the bias electrodes by changing an electrode width(s) of the electrodes constituting the at least one of the bias electrodes stepwise.

7. The optical modulator according to claim 2,
wherein the at least one of the bias electrodes is constituted such that the interval in the at least one of the bias electrodes is set to change linearly by changing a gap(s) between the electrodes constituting the at least one of the bias electrodes linearly.

8. The optical modulator according to claim 2,
wherein the at least one of the bias electrodes is constituted such that the interval in the at least one of the bias electrodes is set to change linearly by changing an electrode width(s) of the electrodes constituting the at least one of the bias electrodes linearly.

9. The optical modulator according to claim 3,
wherein the at least one of the bias electrodes is constituted such that the interval in the at least one of the bias electrodes is set to change non-linearly by changing a gap(s) between the electrodes constituting the at least one of the bias electrodes non-linearly.

10. The optical modulator according to claim 3,
wherein the at least one of the bias electrodes is constituted such that the interval in the at least one of the bias electrodes is set to change non-linearly by changing an electrode width(s) of the electrodes constituting the at least one of the bias electrodes non-linearly.

11. An optical modulator comprising:
a substrate having a piezoelectric effect
an optical waveguide(s) formed on the substrate; and
a plurality of bias electrodes that control an optical wave(s) which propagate through the optical waveguide(s), wherein each of the bias electrodes comprises at least one pair of electrodes which extend with an interval therebetween, wherein the interval in the bias electrodes is set so as to impede a dither signal applied to one of the bias electrodes from being received by another one of the bias electrodes through a surface acoustic wave propagating on a surface of the substrate, and wherein the at least one pair of electrodes constituting the bias electrode are constituted to form a curved line along the optical waveguide through which the optical wave is controlled using the bias electrodes.

* * * * *